US008331224B2

(12) United States Patent
Meirosu et al.

(10) Patent No.: US 8,331,224 B2
(45) Date of Patent: Dec. 11, 2012

(54) SELF-MANAGEMENT OF MOBILITY MANAGEMENT ENTITY (MME) POOLS

(75) Inventors: Catalin Meirosu, Stockholm (SE); Johan Moe, Mantorp (SE); Said Soulhi, Quebec (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 432 days.

(21) Appl. No.: 12/623,832

(22) Filed: Nov. 23, 2009

(65) Prior Publication Data
US 2011/0122779 A1    May 26, 2011

(51) Int. Cl.
*H04W 72/04* (2009.01)
(52) U.S. Cl. .................. 370/229; 455/453; 709/226
(58) Field of Classification Search ....... 370/229–230.1; 455/453; 709/223–226
See application file for complete search history.

(56) References Cited

U.S. PATENT DOCUMENTS

| 8,081,985 | B2 * | 12/2011 | Lopes | ............ 455/453 |
| 2010/0281151 | A1 * | 11/2010 | Ramankutty et al. | ......... 709/223 |
| 2012/0026961 | A1 * | 2/2012 | Pittmann et al. | ............. 370/329 |

FOREIGN PATENT DOCUMENTS

| EP | 1 282 321 A2 | 2/2003 |
| EP | 2 265 054 A1 | 12/2010 |
| WO | WO 2009/056164 A1 | 5/2009 |
| WO | WO 2009/115041 A1 | 9/2009 |

OTHER PUBLICATIONS

International Search Report and Written Opinion of the International Searching Authority corresponding to International Application No. PCT/SE2010/051168; Date of Mailing: Feb. 21, 2011; 14 pages.
3GPP TS 23.401 V8.6.0 (Jun. 2009) Technical Specification, "3rd Generation Partnership Project; Technical Specification Group Services and System Aspects; General Packet Radio Service (GPRS) enhancements for Evolved Universal Terrestrial Radio Access Network (E-UTRAN) access (Release 8)", 227 pages.
3GPP TS 29.274 V8.1.1 (Mar. 2009) Technical Specification, 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 8), 116 pages.

(Continued)

*Primary Examiner* — Kibrom T Hailu
*Assistant Examiner* — Benjamin Lamont
(74) *Attorney, Agent, or Firm* — Myers Bigel Sibley & Sajovec, P.A.

(57) ABSTRACT

A device estimates a load on the device based on static and dynamic load information associated with the device, provides the estimated load to the other devices in a pool of devices, and estimates, based on the estimated load, a weight of the device in the pool. The device also detects a load imbalance in the pool based on the estimated weight and weights associated with the other devices in the pool, and determines, based on the estimated load, a number of subscribers to offload from the device. The device further determines, based on the estimated weight and the weights associated with the other devices, to which of the other devices to offload the determined number of subscribers, and offloads, to address the load imbalance, the determined number of subscribers to the determined other devices in the pool.

23 Claims, 17 Drawing Sheets

OTHER PUBLICATIONS

Wieder, Udi, "Balanced Allocations with Heterogenous Bins", In Proceedings of the Nineteenth Annual ACM Symposium on Parallel Algorithms an Architectures (San Diego, California, USA, Jun. 9-11, 2007). SPAAa '07, ACM, New York, NY, 11 pages.

Anagnostopoulos, Aris et al., "Stability and Efficiency of a Random Local Load Balancing Protocol", 2003, Proceedings of the 44$^{th}$ Annual IEEE Symposium on Foundations of Computer Science (Oct. 11-14, 2003). FOCS. IEEE Computer Society, Washington, D.C. 10 pages.

Azar, Yossi et al., "Balanced Allocations", in Proc. of 26$^{th}$ STOC (1994), 593-602. Also in Siam J. Comput. vol. 29, No. 1, published Aug. 4, 1997, pp. 180-200.

Berenbrink, Petra et al., "Balanced Allocations: The Heavily Loaded Case", In Proceedings of the Thirty-Second Annual ACM Symposium on theory of Computing (Portland, Oregon, United States, May 21-23, 2000). STOC '00. ACM, New York, NY, 745-754, 11 pages.

Bestavros, Azer, "Load Profiling: A Methodology for Scheduling Real-Time Tasks in a Distributed System", In Proceedings of ICDCS '97: The IEEE International Conference on Distributed Computing Systems, Baltimore, Maryland, May 1997, 8 pages.

Dreibholtz, Thomas et al., "Implementing the Reliable Server Pooling Framework", 2005, in Proc. of the IEEE International Conference on Telecommunications (conTEL 2005, Zagreb, Croatia, Jun. 2005, 8 pages.

Godfrey, P. Brighten, "Balls and Bins with Structure: Balanced Allocations on Hypergraphs", 2008, In Proceedings of the Nineteenth Annual ACM-SIAM Symposium on Discrete Algorithms (San Francisco, California, Jan. 20-22, 2008). Symposium on Discrete Algorithms. Society for industrial and Applied Mathematics, Philadelphia, PA 511-517, 7 pages.

Raab, Martin et al., "'Balls into Bins'—A Simple and Tight Analysis", 1998, In Proceedings of the Second international Workshop on Randomization and Approximation Techniques in Computer Science (Oct. 8-10, 1998). M. Luby, J.D. Rolim, and M.J. Serna, Eds. Lecture Notes in Computer Science, vol. 1518. Springer-Verlag, London, 159-170, 12 pages.

\* cited by examiner

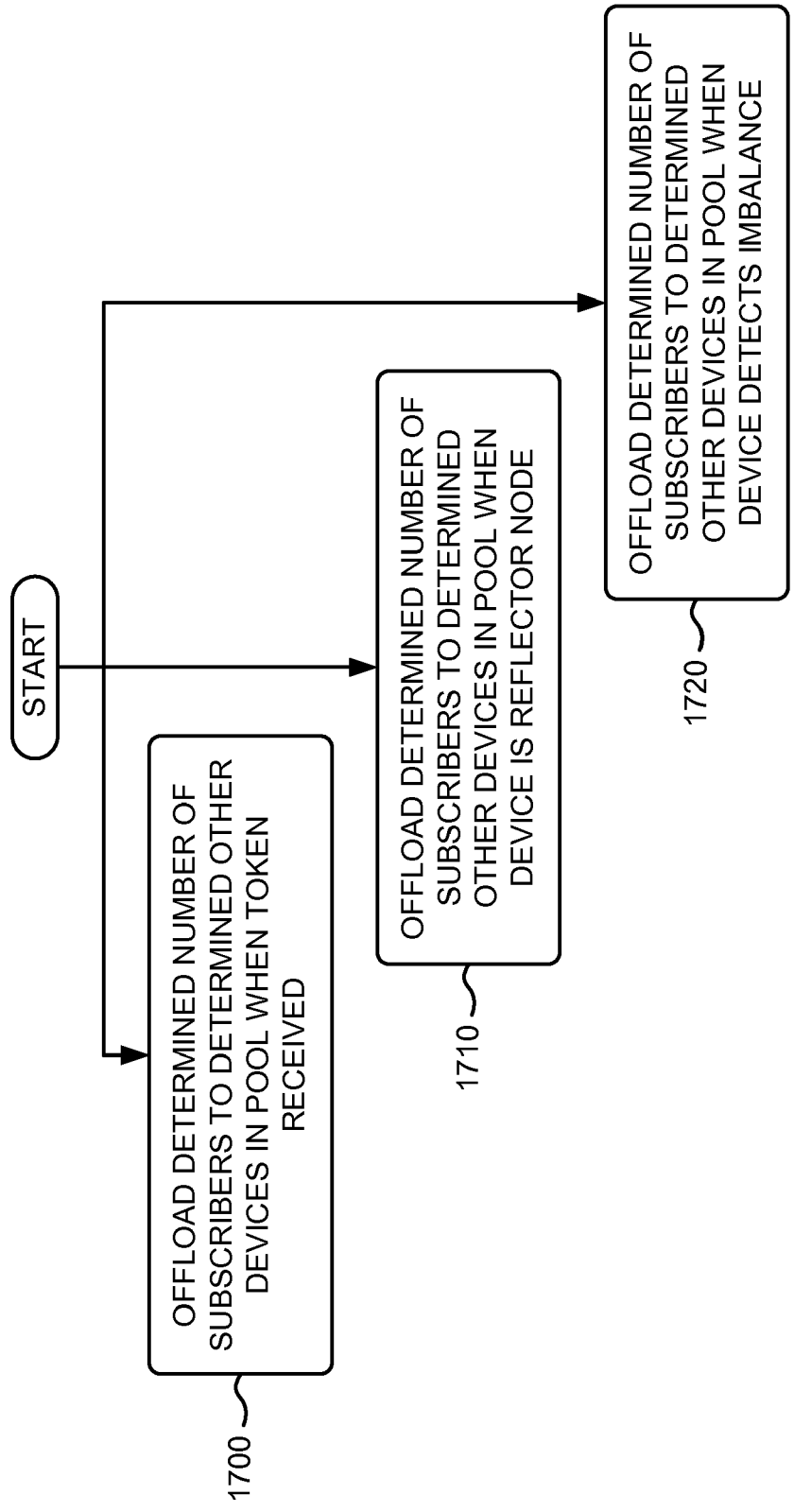

SELF-MANAGEMENT OF MOBILITY MANAGEMENT ENTITY (MME) POOLS

TECHNICAL FIELD

Embodiments described herein relate generally to communication systems, and, more particularly, to self-management of mobility management entity (MME) pools in a telecommunication system.

BACKGROUND

The evolved packet core (EPC) reference model includes a variety of devices, such as mobility management entities (MMEs). A MME is a device that hosts the following functions: non-access stratum (NAS) signaling; NAS signaling security; access server (AS) security control; inter-core network (CN) signaling for mobility between Third Generation Partnership Project (3GPP) access networks; idle mode user equipment (UE) reachability (including control and execution of paging retransmission); tracking area list management (for UEs in idle and active modes); public data network (PDN) gateway (GW) and serving GW selection; MME selection for handovers with MME change; serving general packet radio service (GPRS) support node (SGSN) selection for handovers to 3GPP access networks; roaming; authentication; bearer management functions (e.g., dedicated bearer establishment); support for earthquake and tsunami warning system (ETWS) message transmission; etc.

The MME pool architecture (e.g., defined by the 3GPP) enables radio network elements (e.g., eNodeBs) to decouple from interfacing with a single MME, and permits the radio network elements to access multiple MMEs grouped in a structure known as a "pool." MMEs communicate with each other via S10 interfaces, regardless of whether the MMEs are part of the same pool, different pools, or operate in isolation.

Under current 3GPP standards, MME load balancing achieves load-balanced MMEs with respect to the MMEs' traffic handling capacity within a MME pool (e.g., during system operation). The load balancing is achieved by distributing UEs (e.g., newly entering the MME pool) to different MMEs in the MME pool. With additional intervention (e.g., manual configuration by an operator), MME load balancing may achieve equally loaded MMEs (e.g., within the MME pool) after introduction of a new MME to the network and/or after removal of a MME from the network.

Support for MME load balancing is achieved by providing a relative MME capacity parameter (e.g., in a S1 protocol interface setup procedure) to all eNodeBs (eNBs) served by MMEs of a MME pool (e.g., per MME). In order to support the introduction and/or removal of MMEs, a MME-initiated S1 interface setup update procedure may be used by an operator to indicate changes in the relative MME capacity. The indicated relative MME capacity directs, in the eNBs, the assignment of UEs newly entering the MME pool.

An overload signaling procedure (also part of the S1 protocol) indicates to the eNBs that a serving MME is overloaded (e.g., unable to receive new UE assignments), and indicates to the eNBs that the serving MME has returned to a normal operation mode once the overload condition has been cleared. S1 interface messages are defined in the S1 protocol, as set forth in 3GPP TS 23.401. Details of what the MME could request from the eNBs while operating in an overload situation are also included in 3GPP TS 23.401. 3GPP TS 23.401 further specifies certain conditions and recommendations for how to offload subscribers (e.g., UEs) from an MME, when the MME is undergoing maintenance. This operation is known as load re-balancing between MMEs.

Load balancing (also known as the "m balls into n bins problem") has been comprehensively studied for many years in mathematics and computer science. Both centralized and distributed solutions have been proposed. The majority of theoretical studies involve some level of knowledge about the load of the bins, before deciding in which bin to place a particular ball. A significant (e.g., exponential) decrease between differences in the number of balls between the bins could be achieved if the load of two randomly sampled bins is known and the ball is thrown into the bin with the least load.

Generic communication protocols that support load balancing have also been proposed. Centralized versions of such communication protocols require the existence of a node (or set of nodes) that has perfect knowledge of a load on a system. Such a node is commonly referred to as an oracle. In one exemplary system, a centralized, oracle-based scheme for pool server management is used. Processing resources register themselves with the oracle and report load information to the oracle via a protocol.

A proposed distributed solution permits nodes to build approximate knowledge of an overall system load by exchanging information between small sets of nodes using a gossip protocol. Each node computes its load, disseminates its load using the gossip protocol, and uses multicast for urgent dissemination of its load (e.g., when the load changes quickly).

A proposed node-based solution achieves a balanced system by permitting processing nodes to directly offload jobs between themselves. The strategy is based on random matching nodes and having the nodes equalize the load (e.g., measured in jobs that are greater than a particular age). The system handles both static load (e.g., where no new jobs enter the system after a particular time) and dynamic load (e.g., where new jobs enter and some existing jobs leave the system at any time).

The current solutions for load balancing have several disadvantages. For example, pure random assignment of UEs (e.g., by eNBs) to MMEs within a MME pool creates an imbalance between the most occupied and least occupied MME. Furthermore, the MME relative capacity (set forth in 3GPP TS 23.401), which is used when implementing a weighted round-robin assignment of UEs (e.g., by eNBs) to MMEs, is expressed as one value per MME. It remains a manufacturer-specific feature to determine if the MME relative capacity is to be made proportional only with a number of licenses supported by the MME or if the signaling capacity of the MME is to be considered as well. If the signaling capacity of the MME is considered, a single dimensional value may be insufficient to create an unambiguous representation of the MME relative capacity.

The mechanism described in 3GPP TS 23.401 also creates temporary interruptions of UE services while a re-balancing operation is taking place. Furthermore, triggering re-balancing operations during MME maintenance and upgrade operations requires significant manual intervention. If failures occur that temporarily reduce the MME capacity, current solutions require manual intervention for determining a new set of load weights and for disseminating the new set of load weights. For inter-pool mobility (e.g., during S1 handovers or when an idle UE crosses a boundary between areas served by different MME pools) current solutions fail to take into account information related to a load on a target MME pool in order to optimize user placement within a new MME pool.

The overload signaling procedure permits the MME to tell eNBs to no longer send new subscribers (e.g., UEs), but does not specify what to do to solve an overload situation. Presumably, solving an overload situation in this procedure would involve manual intervention where an operator manually offloads some served UEs to other MMEs in the pool.

The centralized solutions require load information from a MME pool to be propagated to a centralized oracle that receives requests from eNBs about which MME to assign a particular UE. Such centralized solutions add delay (e.g., due to the communication between the eNBs and the oracle) and increase scalability requirements for the oracle.

The distributed solution requires a MME pool to provide load information to all served eNBs, in addition to making the load information available to members of other MME pools. Further, given a maximum number of devices in a MME pool (e.g., sixteen, thirty-two, or sixty-four), a gossip-based strategy for load information dissemination fails to address scalability issues.

The node-based solution, as applied to a MME pool, may enable a system to be maintained in a balanced state by continuously moving UEs between MMEs in the pool. However, the one-to-one matching between processing nodes proposed by the solution would not permit automatic handling of maintenance situations (e.g., when a MME needs to offload its entire load) without creating further imbalances in the MME pool.

SUMMARY

It is an object of the invention to overcome at least some of the above disadvantages, and to provide systems and/or methods for self-managing MMEs in a MME pool.

An embodiment described herein may provide a method that is performed by a device provided in a pool of other devices. The method may include estimating, by the device, a load on the device based on static and dynamic load information associated with the device; providing, by the device, the estimated load to the other devices in the pool; estimating, by the device and based on the estimated load, a weight of the device in the pool; detecting, by the device, a load imbalance in the pool based on the estimated weight and weights associated with the other devices in the pool; determining, by the device and based on the estimated load, a number of subscribers to offload from the device; determining, by the device and based on the estimated weight and the weights associated with the other devices, to which of the other devices to offload the determined number of subscribers; and offloading, by the device and to address the load imbalance, the determined number of subscribers to the determined other devices in the pool.

Another embodiment described herein may provide a device in a network that includes a pool of other devices associated with the device. The device may include a memory to store a plurality of instructions, and a processor to execute instructions in the memory to estimate a load on the device based on one or more of a number of users registered with the device, a number of active calls associated with the device, a number of active sessions associated with the device, or a number of tracking area update (TAU) procedures associated with the device. The processor may further execute instructions in the memory to provide the estimated load to the other devices, estimate, based on the estimated load, a weight of the device in the pool, and advertise the estimated weight of the device to the other devices. The processor may also execute instructions in the memory to detect a load imbalance in the pool based on the estimated weight and weights associated with the other devices, determine a number of subscribers to offload from the device based on the estimated load, determine to which of the other devices to offload the determined number of subscribers based on the estimate weight and the weights associated with the other devices, and offload, to address the load imbalance, the determined number of subscribers to the determined other devices in the pool.

Still another embodiment described herein may provide a system that includes a pool of MMEs, where each MME may estimate a load of the MME based on static and dynamic load information, may provide the estimated load to the other MMEs in the pool of MMEs, and may estimate, based on the estimated load, a weight of the MME in the pool. Each MME may detect a load imbalance in the pool based on the estimated weight and weights associated with the other MMEs, and may determine a number of subscribers to offload from the MME based on the estimated load. Each MME may determine to which of the other MMEs to offload the determined number of subscribers based on the estimated weight and the weights associated with the other MMEs, and may offload, to address the load imbalance, the determined number of subscribers to the determined other MMEs.

Systems and/or methods described herein may provide a decentralized approach for MME pool management. As such, the MME pool may automatically balance loads between MMEs, and therefore, may become self managing. The systems and/or methods may provide pool management functionality to each MME in a MME pool. The pool management functionality may include a load estimator function to estimate a load on a MME, and a weight estimator function to estimate a weight of the MME (e.g., based on the load) in the MME pool and to automatically recalculate the weight based on changing load conditions in the MME pool. The pool management functionality may also include a bulk move negotiation function to determine a number of subscribers to offload from the MME, and a bulk move function to offload the subscribers to other MMEs in the MME pool. The weight estimator function and the bulk move function may prevent load imbalance between the MMEs and may be executed separately or in combination. By automatically recalculating the weight of the MME (e.g., based on changing load conditions in the MME pool), new UEs may be served by a least loaded MME. The bulk move function may handle load imbalances quickly since it addresses currently connected UEs, and may enable an overloaded MME to be offloaded. The MMEs in the MME pool may communicate with each other via an extension (e.g., provided by a set of messages described herein) of 3GPP S10 interfaces associated with the MMEs.

BRIEF DESCRIPTION OF THE DRAWINGS

FIGS. 13-17 illustrate flow charts of an exemplary process for self-management of a MME pool according to embodiments described herein.

DETAILED DESCRIPTION

The following detailed description refers to the accompanying drawings. The same reference numbers in different drawings may identify the same or similar elements. Also, the following detailed description does not limit the invention.

Figure 1:
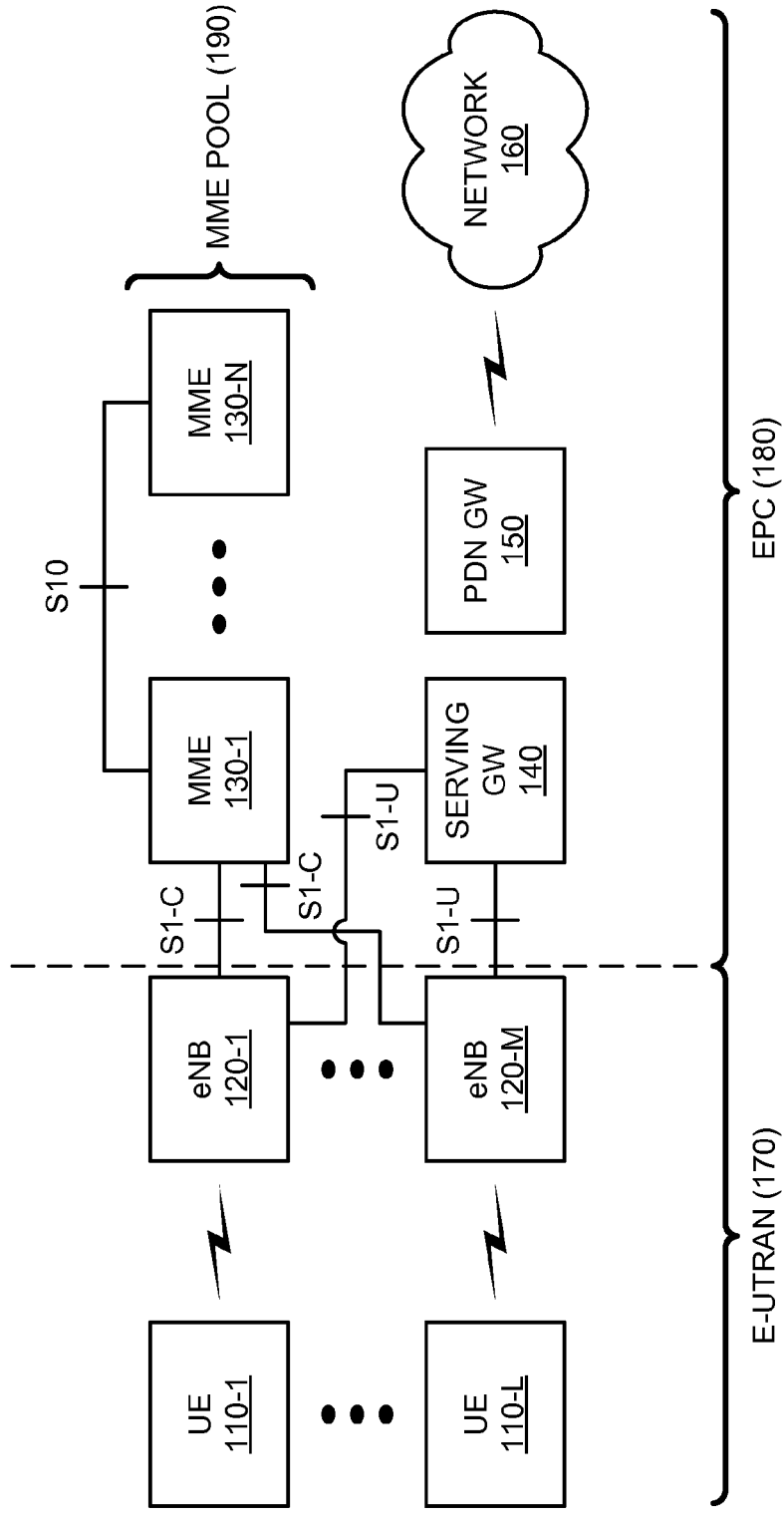
FIG. 1 depicts a diagram of an exemplary network in which systems and/or methods described herein may be implemented.

FIG. 1 depicts a diagram of an exemplary network 100 in which systems and/or methods described herein may be implemented. As shown, network 100 may include a group of user equipment (UE) 110-1 through 110-L (referred to collectively as "UEs 110", and in some instances individually, as "UE 110"), a group of eNodeBs (eNBs) 120-1 through 120-M (referred to collectively as "eNBs 120" and in some instances, individually as "eNB 120"), a group of mobility management entities (MMEs) 130-1 through 130-N (referred to collectively as "MMEs 130" and in some instances, individually as "MME 130"), a serving gateway (GW) 140, a public data network (PDN) gateway (GW) 150, and a network 160. As further shown, UEs 110 and eNBs 120 may be associated with an evolved universal terrestrial radio access network (E-UTRAN) 170; MMEs 130, serving GW 140, PDN GW 150, and network 160 may be associated with an evolved packet core (EPC) network 180; and MMEs 130 may form a MME pool 190. Two UEs 110, two eNBs 120, two MMEs 130, a single serving GW 140, a single PDN GW 150, a single network 160, a single E-UTRAN 170, a single EPC network 180, and a single MME pool 190 have been illustrated in FIG. 1 for simplicity. In practice, there may be more UEs 110, eNBs 120, MMEs 130, serving GWs 140, PDN GWs 150, networks 160, E-UTRANs 170, EPC networks 180, and/or MME pools 190. Also, in some instances, a component in network 100 may perform one or more functions described as being performed by another component or group of components in network 100.

UE 110 may include one or more computation and/or communication devices capable of sending/receiving voice and/or data to/from eNBs 120. UE 110 may include, for example, a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, etc.

eNB 120 may include one or more computation and/or communication devices that receive voice and/or data from one of MMEs 130 and/or serving GW 140 and transmit that voice and/or data to UE 110 via an air interface. eNB 120 may also include one or more devices that receive voice and/or data from UE 110 over an air interface and transmit that voice and/or data to one of MMEs 130 and/or serving GW 140 or to other UEs 110.

MME 130 may include one or more computation and/or communication devices that control and manage eNBs 120. MME 130 may perform one or more of the following functions: NAS signaling; NAS signaling security; AS security control; inter-CN signaling for mobility between 3GPP access networks; idle mode UE reachability; tracking area list management (for UEs 110 in idle and active modes); serving GW 140 and PDN GW 150 selection; MME 130 selection for handovers with MME 130 change; SGSN selection for handovers to 3GPP access networks; roaming; authentication; bearer management functions; support for ETWS message transmission; etc.

In one exemplary embodiment, MME 130 may estimate a load of MME 130 (e.g., MME 130-1) based on static and dynamic load information, may provide the estimated load to other MMEs 130 (e.g., MMEs 130-2 through 130-N) in MME pool 190, and may estimate, based on the estimated load, a weight of MME 130 in MME pool 190. MME 130 may detect a load imbalance in MME pool 190 based on the estimated weight and weights associated with the other MMEs 130, and may determine a number of subscribers to offload from MME 130 based on the estimated load. MME 130 may determine to which of the other MMEs 130 to offload the determined number of subscribers based on the estimated weight and the weights associated with the other MMEs 130, and may offload, to address the load imbalance, the determined number of subscribers to the determined other MMEs 130.

Serving GW 140 may include one or more computation and/or communication devices that route and forward user data packets to/from eNBs 120 and/or PDN GW 150, act as a mobility anchor for the user plane during inter-eNB handovers, and act as an anchor for mobility between long term evolution (LTE) and other 3GPP technologies.

PDN GW 150 may include one or more computation and/or communication devices that provide connectivity between UEs 110 and external packet data networks (e.g., network 160). PDN GW 150 may act as a point of entry and exit for traffic to UEs 110, may control IP data services, may perform routing, may allocate IP addresses, may provide access for non-3GPP access networks, and may enforce policies.

Network 160 may include a local area network (LAN), a wide area network (WAN), a metropolitan area network (MAN), a telephone network, such as the Public Switched Telephone Network (PSTN), a cellular network, a Wi-Fi network, an intranet, the Internet, an optical fiber (or fiber optic)-based network, or a combination of networks.

As further shown in FIG. 1, eNBs 120 may interconnect with MMEs 130 via S1-C interfaces, and eNBs 120 may interconnect with serving GW 140 via S1-U interfaces. MMEs 130 may interconnect via S10 interfaces.

Although FIG. 1 shows exemplary components of network 100, in other embodiments, network 100 may include fewer, different, differently arranged, or additional components than depicted in FIG. 1.

Figure 2:
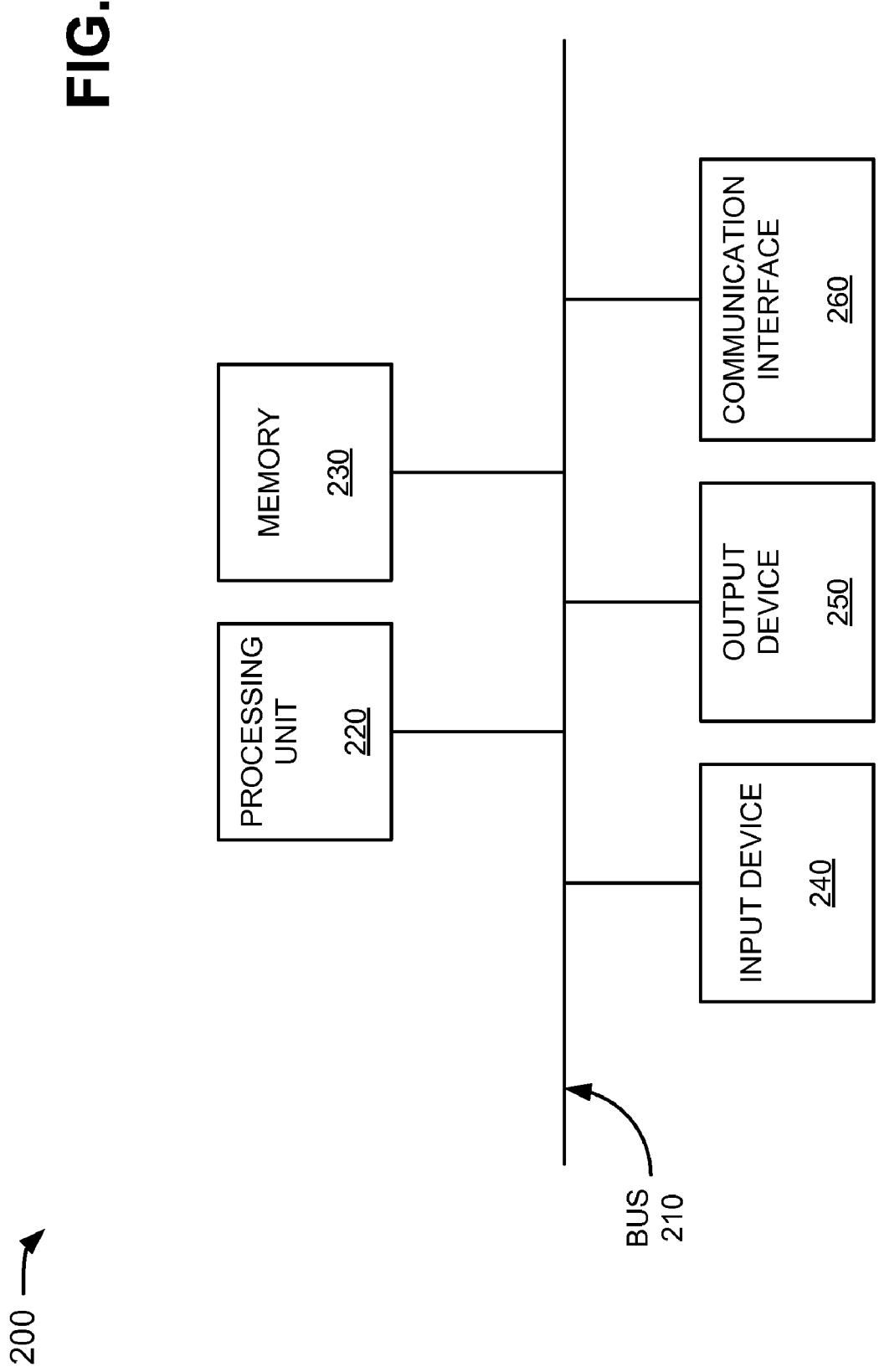
FIG. 2 illustrates a diagram of exemplary components of a device that may correspond to one of the devices of the network depicted in FIG. 1.

FIG. 2 illustrates a diagram of exemplary components of a device 200 that may correspond to one of the devices of network 100. As shown, device 200 may include a bus 210, a processing unit 220, a memory 230, an input device 240, an output device 250, and a communication interface 260.

Bus 210 may permit communication among the components of device 200. Processing unit 220 may include one or more processors and/or microprocessors that interpret and execute instructions. In some embodiments, processing unit 220 may be implemented as or include one or more application specific integrated circuits (ASICs), field programmable gate arrays (FPGAs), or the like. Memory 230 may include a random access memory (RAM) or another type of dynamic storage device that stores information and instructions for execution by processing unit 220, a read only memory (ROM) device and/or another type of static storage device that stores static information and instructions for the processing unit 220, a magnetic or optical recording medium and its corresponding drive for storing information and/or instructions, and/or other types of memory.

Input device 240 may include a device that permits an operator to input information to device 200, such as a keyboard, a keypad, a mouse, a pen, a microphone, one or more biometric mechanisms, and the like. Output device 250 may include a device that outputs information to the operator, including a display, a printer, a speaker, etc.

Communication interface 260 may include any transceiver-like mechanism that enables device 200 to communicate with other devices and/or systems. For example, communication interface 260 may include mechanisms for communicating with another device or system via a network.

As described herein, device 200 may perform certain operations in response to processing unit 220 executing software instructions contained in a computer-readable medium, such as main memory 230. A computer-readable medium may be defined as one or more physical and/or logical memory devices. A logical memory device may include a space within a single physical memory device or spread across multiple physical memory devices. The software instructions may be read into memory 230 from another computer-readable medium or from another device via communication interface 260. The software instructions contained in memory 230 may cause processing unit 220 to perform processes that will be described later. Alternatively, hardwired circuitry may be used in place of or in combination with software instructions to implement processes described herein. Thus, systems and/or methods described herein are not limited to any specific combination of hardware circuitry and software.

Although FIG. 2 shows exemplary components of device 200, in other implementations, device 200 may contain fewer, different, differently arranged, or additional components than depicted in FIG. 2. Additionally or alternatively, one or more components of device 200 may perform one or more other tasks described as being performed by one or more other components of device 200.

Figure 3:
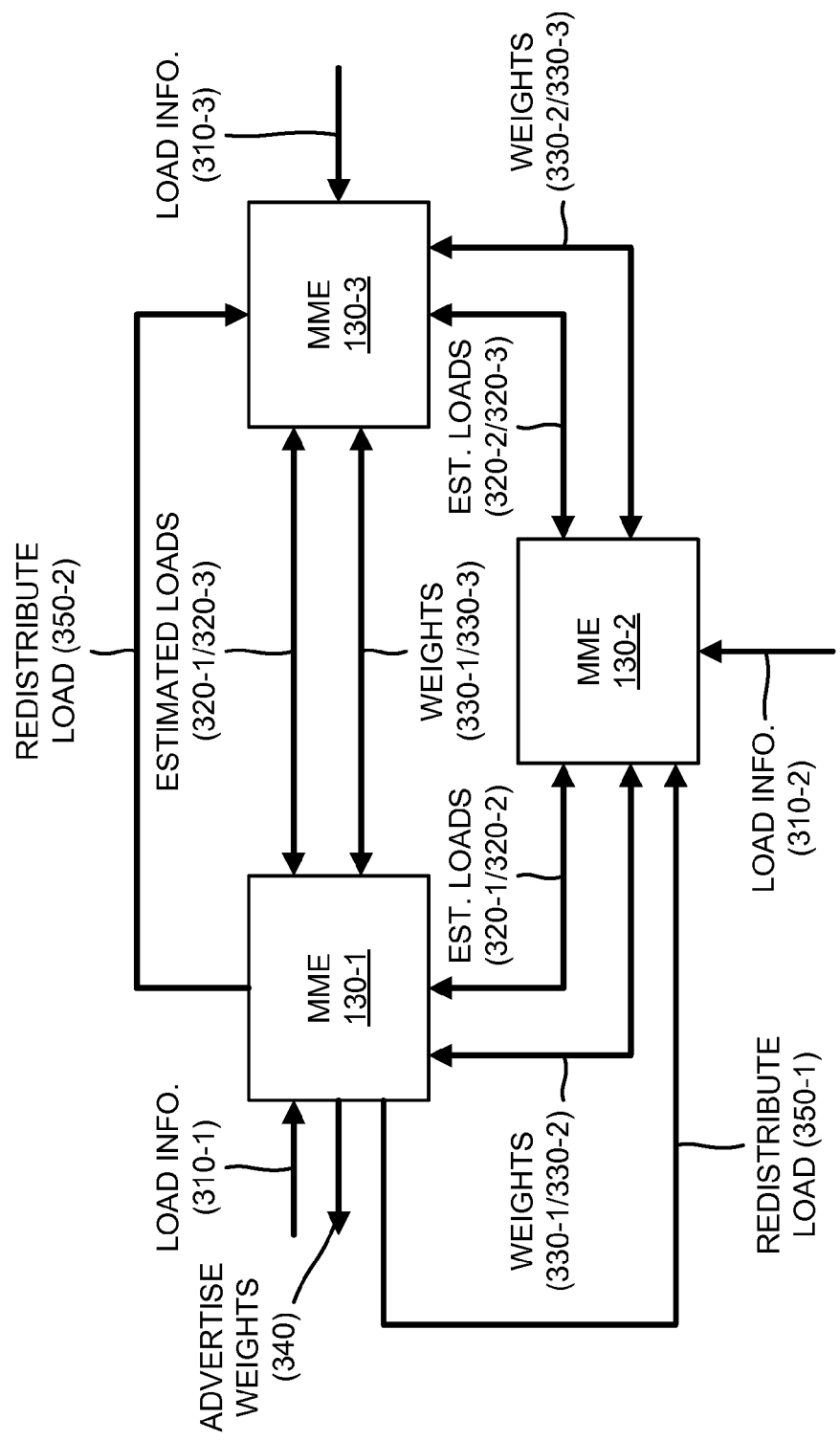
FIG. 3 depicts a diagram of exemplary interactions among components of an exemplary portion of the network illustrated in FIG. 1.

FIG. 3 depicts a diagram of exemplary interactions among components of an exemplary portion 300 of network 100. As illustrated, exemplary network portion 300 may include MMEs 130-1, 130-2, and 130-3. MMEs 130-1, 130-2, and 130-3 may define a MME pool (e.g., MME pool 190) and may include the features described above in connection with, for example, FIGS. 1 and 2.

As further shown in FIG. 3, MME 130-1 may receive load information 310-1, MME 130-2 may receive load information 310-2, and MME 130-3 may receive load information 310-3. Load information 310-1 may include momentary loads (e.g., a number of active calls and/or sessions associated with MME 130-1, a number of users (UEs 110) registered in MME 130-1, etc.) associated with MME 130-1. Load information 310-2 may include momentary loads (e.g., a number of active calls and/or sessions associated with MME 130-2, a number of users (UEs 110) registered in MME 130-2, etc.) associated with MME 130-2. Load information 310-3 may include momentary loads (e.g., a number of active calls and/or sessions associated with MME 130-3, a number of users (UEs 110) registered in MME 130-3, etc.) associated with MME 130-3.

Each of MMEs 130 may estimate its own load based on load information 310, and may provide the estimated load to other MMEs 130 in MME pool 190. For example, MME 130-1 may estimate its load 320-1 based on load information 310-1, and may provide its estimated load 320-1 to MME 130-2 and MME 130-3. MME 130-2 may estimate its load 320-2 based load information 310-2, and may provide its estimated load 320-2 to MME 130-1 and MME 130-3. MME 130-3 may estimate its load 320-3 based on load information 310-3, and may provide its estimated load 320-3 to MME 130-1 and MME 130-2. In one example, each MME 130 may exchange estimated loads 320 simultaneously with other MMEs 130 in MME pool 190. In another example, MME 130-1 may provide estimated load 320-1 to MMEs 130-2 and 130-3 at a first time, MME 130-2 may provide estimated load 320-2 to MMEs 130-1 and 130-3 at a second time (e.g., different than the first time), and MME 130-3 may provide estimated load 320-3 to MMEs 130-1 and 130-3 at a third time (e.g., different than the first and second times).

Each of MMEs 130 may estimate its weight in MME pool 190 based on estimated load 320 and/or other information (e.g., policy information, estimated loads 320 of other MMEs 130), and may advertise the estimated weight to other MMEs 130 in MME pool 190. For example, MME 130-1 may estimate its weight 330-1 in MME pool 190 based on estimated loads 320-1, 320-2, and 320-3, and may advertise estimated weight 330-1 to MME 130-2 and MME 130-3. MME 130-2 may estimate its weight 330-2 in MME pool 190 based on estimated loads 320-1, 320-2, and 320-3, and may advertise estimated weight 330-2 to MME 130-1 and MME 130-3. MME 130-3 may estimate its weight 330-3 in MME pool 190 based on estimated loads 320-1, 320-2, and 320-3, and may advertise estimated weight 330-3 to MME 130-1 and MME 130-2.

One or more of MMEs 130 may advertise weights 330 to eNBs 120 associated with MMEs 130. For example, as shown in FIG. 3, MME 130-1 may advertise weights 330-1, 330-2, and 330-3 to eNBs 120 (not shown), as indicated by reference number 340. In one example, one or more of MMEs 130 may advertise weights 330 to eNBs 120 through S1-AP protocol messages. Each of MMEs 130 may include its own S1 interface connection to eNBs 120, and may advertise weights 330 to eNBs via a S1-AP updated configuration message provided on the S1 interface connection. MMEs 130 may coordinate with one another (e.g., via a policy) to minimize the number of messages sent to eNBs 120 (e.g., advertising weights 330) and to ensure a consistent set of weights 330 are provided to eNBs 120.

One of MMEs 130 may detect a load imbalance in MME pool 190 based on its estimated weight 330 and weights of other MMEs 130 in MME pool 190. For example, MME 130-1 may detect a load imbalance in MME pool 190 (e.g., that MME 130-1 is overloaded) based on estimated weight 330-1 and weights 330-2 and 330-3 associated with MMEs 130-2 and 130-3, respectively. MME 130-1 may determine a number of subscribers (e.g., UEs 110 associated with MME 130-1) to offload from MME 130-1 (e.g., to address the load imbalance), and may determine to which other MMEs 130 in MME pool 190 to offload the subscribers. In one example, MME 130-1 may determine that a particular number of subscribers should be offloaded from MME 130-1 and provided to MMEs 130-2 and 130-3. MME 130-1 may redistribute or offload a portion of the determined subscribers (e.g., the load) to MME 130-2, as indicated by reference number 350-1, and/or may redistribute or offload a portion of the determined subscribers (e.g., the load) to MME 130-3, as indicated by reference number 350-2.

Although FIG. 3 shows exemplary components of network portion 300, in other implementations, network portion 300 may contain fewer, different, differently arranged, or additional components than depicted in FIG. 3. Additionally or alternatively, one or more components of network portion 300 may perform one or more other tasks described as being performed by one or more other components of network portion 300.

Figure 4:
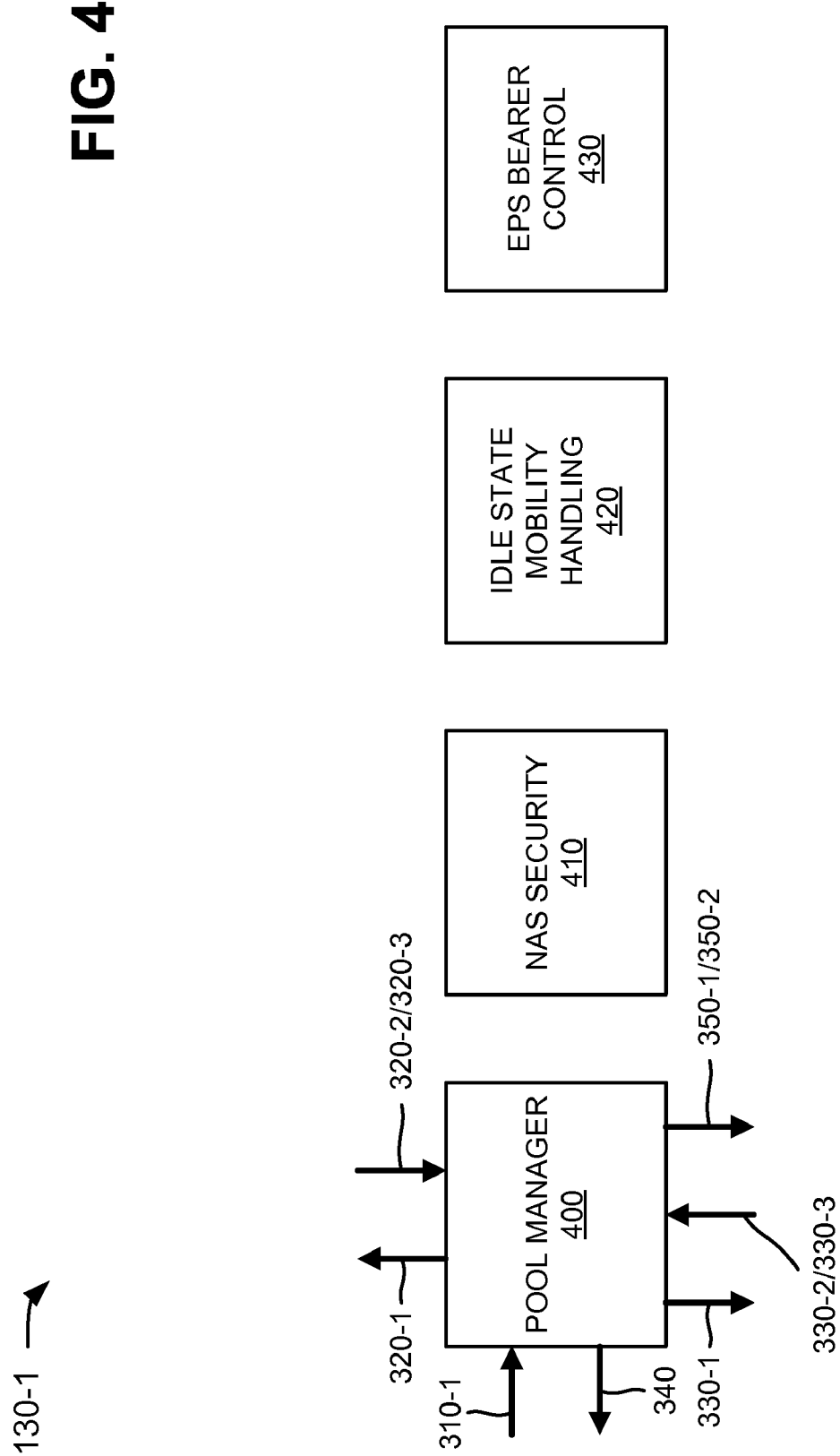
FIG. 4 is a diagram of exemplary functional components of a mobility management entity (MME) depicted in FIG. 1.

FIG. 4 is a diagram of exemplary functional components of one of MMEs 130 (e.g., MME 130-1). MMEs 130-2 through 130-N may be similarly arranged. In one embodiment, the functions described in connection with FIG. 4 may be performed by one or more components of device 200 (FIG. 2). As shown in FIG. 4, MME 130-1 may include a pool manager 400, a NAS security component 410, an idle state mobility handling component 420, and an evolved packet system (EPS) bearer control component 430.

Pool manager 400 may include any hardware or combination of hardware and software that may receive load information 310-1, may estimate load 320-1 based on load information 310-1, and may provide estimated load 320-1 to MME 130-2 and MME 130-3. Pool manager 400 may receive estimated loads 320-2 and 320-3 from MMEs 130-2 and 130-3, respectively. Pool manager 400 may estimate weight 330-1 in MME pool 190 based on estimated loads 320-1, 320-2, and 320-3, and may advertise estimated weight 330-1 to MME 130-2 and MME 130-3. Pool manager 400 may receive estimated weights 330-2 and 330-3 from MMEs 130-2 and 130-3, respectively, and may advertise weights 330-1, 330-2, and 330-3 to eNBs 120 (not shown), as indicated by reference number 340. Pool manager 400 may detect a load imbalance in MME pool 190 (e.g., MME 130-1 may be overloaded) based on estimated weights 330-1, 330-2, and 330-3, may determine a number of subscribers to offload from MME 130-1, and may determine to which MMEs 130 the determined number of subscribers should be offloaded. MME 130-1 may offload a portion of the determined subscribers (e.g., the load) to MME 130-2, as indicated by reference number 350-1, and/or may offload a portion of the determined subscribers (e.g., the load) to MME 130-3, as indicated by reference number 350-2.

NAS security component 410 may include any hardware or combination of hardware and software that may generate and allocate temporary identities to UEs 110, and may check authorization of a UE to camp on a service provider's network (e.g., a Public Land Mobile Network (PLMN)). NAS security component 410 may also enforce UE roaming restrictions.

Idle state mobility handling component 420 may include any hardware or combination of hardware and software that may perform procedures when a UE 110 is in an idle state (e.g., not on a call). These procedures may include cell selection (e.g., which may be performed after UE 110 is switched on), and cell re-selection (e.g., which may be performed when UE 110 moves from one cell to another cell).

EPS bearer control component 430 may include any hardware or combination of hardware and software that may control an EPS bearer (e.g., a unique identifier of traffic flow that receives a common QoS treatment between UE 110 and PDN GW 150) associated with MME 130-1.

Although FIG. 4 shows exemplary functional components of MME 130-1, in other implementations, MME 130-1 may contain fewer, different, differently arranged, or additional functional components than depicted in FIG. 4. Additionally or alternatively, one or more functional components of MME 130-1 may perform one or more other tasks described as being performed by one or more other functional components of MME 130-1.

Figure 5:
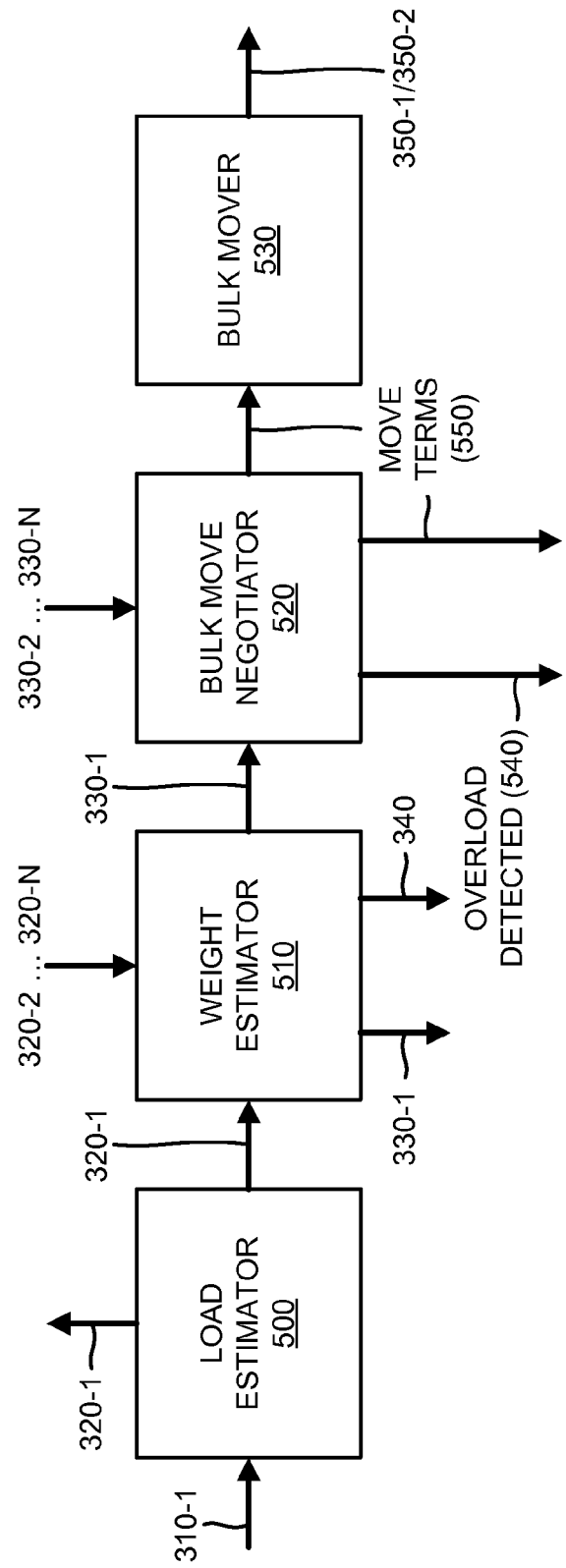
FIG. 5 is a diagram of exemplary functional components of a pool manager illustrated in FIG. 4.

FIG. 5 is a diagram of exemplary functional components of pool manager 400. In one embodiment, the functions described in connection with FIG. 5 may be performed by one or more components of device 200 (FIG. 2). As shown in FIG. 5, pool manager 400 may include a load estimator 500, a weight estimator 510, a bulk move negotiator 520, and a bulk mover 530.

Load estimator 500 may include any hardware or combination of hardware and software that may receive load information 310-1, and may calculate estimated load 320-1 based on load information 310-1, and may provide estimated load 320-1 to MMEs 130-2, . . . , 130-N and to weight estimator 510. In one example, load estimator 500 may determine estimated load 320-1 on MME 130-1 based on dynamic load information (e.g., number of active calls and/or sessions associated with MME 130-1, a number of tracking area update procedures associated with MME 130-1, etc.) and/or static load information (e.g., a number of users (UEs 110) registered in MME 130-1). In one exemplary embodiment, load estimator 500 may calculate estimated load 320-1 (Load) according to the following equations:

$$\text{Load} = a * \text{Static} + b * \text{Dynamic}$$

$$\text{Load} = a * \left( \frac{a_1 * SAU}{\max SAU} + \frac{a_2 * TAU}{\max TAU} \right) +$$
$$b * \left( \frac{b_1 * \text{CPU\_load}}{100} + \frac{b_2 * \text{PDP\_Contexts}}{\max PDPContexts} + \frac{b_3 * \text{TAU\_d}}{\max TAU\_d} + \frac{b_4 * HO}{\max HO} \right),$$

where:

a, $a_1$, $a_2$, b, $b_1$, $b_2$, $b_3$, and $b_4$ may include constants;

SAU may include a number of users (e.g., UEs 110) registered in MME 130-1;

maxSAU may include a maximum number of users licensed for MME 130-1;

TAU_s may include a number of Tracking Area Update procedures caused by a timeout and performed during last counting interval associated with MME 130-1;

maxTAU may include a maximum number of Tracking Area Update procedures that may be supported by MME 130-1 (e.g., may be a function of the hardware and a maximum number of users licensed for MME 130-1);

CPU_Load may include a central processing unit (CPU) load measured on all CPUs of MME 130-1 during a last counting interval;

PDP_Contexts may include a number of simultaneously active packet data protocol (PDP) contexts in MME 130-1;

maxPDP_Contexts may include a maximum number of simultaneously active PDP contexts supported by MME 130-1;

TAU_d may include a number of Tracking Area Update procedures caused by crossing tracking area borders and performed during last counting interval associated with MME 130-1;

HO may include number of handovers performed during a last counting interval associated with MME 130-1; and maxHO may include a maximum number of handovers that may be supported by MME 130-1 (e.g., may be a function of hardware and a maximum number of users licensed for MME 130-1).

Weight estimator 510 may include any hardware or combination of hardware and software that may receive estimated load 320-1 from load estimator 500, and may receive estimated loads 320-2, . . . , 320-N from other MMEs 130-2, . . . , 130-N of MME pool 190. Weight estimator 510 may calculate estimated weight 330-1 based on estimated load 320-1 (e.g., and based on estimated loads 320-2, . . . , 320-N), may advertise estimated weight 330-1 to MMEs 130-2, . . . , 130-N, and may provide estimated weight 330-1 to bulk move negotiator 520. Weight estimator 510 may advertise weights 330-1, ..., 330-N to eNBs 120 (not shown), as indicated by reference number 340. In one example, weight estimator 510 may calculate estimated weight 330-1 based on a momentary load (e.g., estimated load 320-1) associated with MME 130-1, a maximum number of users (e.g., UEs 110) registered in MME 130-1, and/or a policy provided by an operator of MME 130-1.

Bulk move negotiator 520 may include any hardware or combination of hardware and software that may receive estimated weight 330-1 from weight estimator 510, and may receive estimated weights 330-1, ..., 330-N from MMEs 130-2, ..., 130-N. Bulk move negotiator 520 may detect a load imbalance in MME pool 190 (e.g., an overload of MME 130-1 may be detected, as indicated by reference number 540) based on estimated weight 330-1 and estimated weights 330-1, ..., 330-N associated with MMEs 130-2, ..., 130-N, respectively. Bulk move negotiator 520 may determine a number of subscribers (e.g., UEs 110 associated with MME 130-1) to offload from MME 130-1 (e.g., to address the load imbalance), and may determine to which other MMEs 130 in MME pool 190 to offload the subscribers. In one example, bulk move negotiator 520 may determine move terms 550 indicating that a particular number of subscribers should be offloaded from MME 130-1 and provided to MME 130-2 and/or 130-3. Bulk move negotiator 520 may provide move terms 550 to bulk mover 530 and to MME 130-2 and/or 130-3. In one example, bulk move negotiator 520 may determine (e.g., via move terms 550) how quickly the subscribers should be offloaded from MME 130-1. Although bulk move negotiator 520 may be activated when an overload is detected, in one example, bulk move negotiator 520 may be preemptively activated to prevent a potential overload situation. In another example, the functions associated with bulk move negotiator 520 may be optional and may be implemented by an operator-defined policy.

Bulk mover 530 may include any hardware or combination of hardware and software that may receive move terms 550 from bulk move negotiator 520. Bulk mover 530 may implement move terms 550, which may cause bulk mover 530 to redistribute a portion of the determined subscribers (e.g., the load) to MME 130-2, as indicated by reference number 350-1, and/or to redistribute a portion of the determined subscribers (e.g., the load) to MME 130-3, as indicated by reference number 350-2.

In one example, bulk mover 530 may transfer user contexts (e.g., associated with the moved UEs 110) according to 3GPP procedures. Bulk mover 530 may select which actual users (e.g., selected from active UEs 110, non-active UEs 110, etc.) will be moved (e.g., when not all of the served users need to be moved), and may determine an order in which to transfer the selected users. In another example, bulk mover 530 may move the non-active subscribers (e.g., non-active UEs 110) according to 3GPP procedures, may move the active subscribers (e.g., active UEs 110) without interrupting service to the active subscribers, and may follow up and report on the progress of the move operation.

Although FIG. 5 shows exemplary functional components of pool manager 400, in other implementations, pool manager 400 may contain fewer, different, differently arranged, or additional functional components than depicted in FIG. 5. Additionally or alternatively, one or more functional components of pool manager 400 may perform one or more other tasks described as being performed by one or more other functional components of pool manager 400.

A distributed solution to MME pool management may include each of MMEs 130 performing the functions described above in connection with FIGS. 4 and 5. These functions may be performed in parallel by MMEs 130 within MME pool 190. This may create issues related to timely accessing information (e.g., load information 310 associated with MMEs 130), distributed decision making regarding a move of users (e.g., UEs 110), and synchronizing performance of the move. FIGS. 6-11 present several exemplary techniques for addressing these issues, but other techniques may be employed as well.

Figure 6:
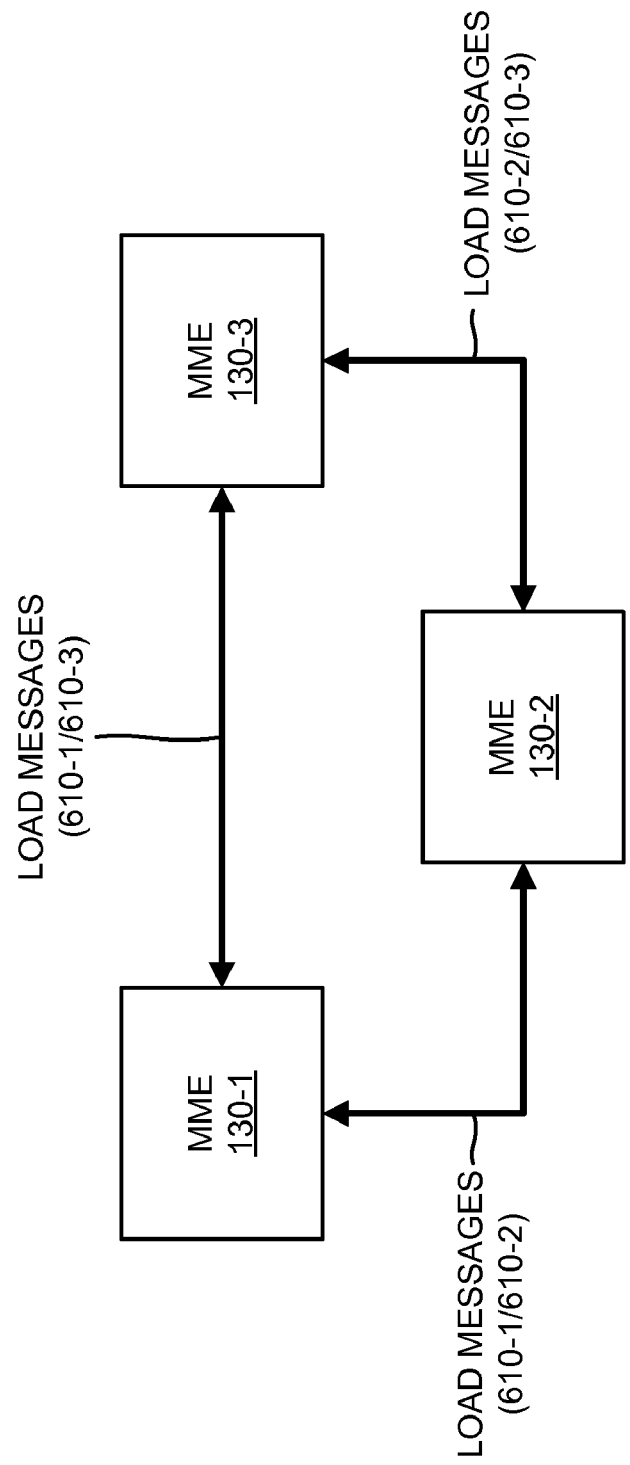
FIGS. 6-11 illustrate diagrams of exemplary interactions among components of exemplary portions of the network depicted in FIG. 1.

FIGS. 6-11 illustrate diagrams of exemplary interactions among components of exemplary portions 600-1100 of network 100. As shown in FIG. 6, exemplary network portion 600 may include MMEs 130-1, 130-2, and 130-3. MMEs 130-1, 130-2, and 130-3 may define a MME pool (e.g., MME pool 190) and may include the features described above in connection with, for example, FIGS. 1-5.

FIG. 6 may depict one exemplary technique for exchanging load information (e.g., load information 310) associated with MMEs 130. As shown, each of MMEs 130 may send particular load messages 610 to every other MME 130 in MME pool 190. For example, MME 130-1 may send a load message 610-1 to MMEs 130-2 and 130-3. Load message 610-1 may include a momentary load (e.g., estimated load 320-1) associated with MME 130-1. MME 130-2 may send a load message 610-2 to MMEs 130-1 and 130-3. Load message 610-2 may include a momentary load (e.g., estimated load 320-2) associated with MME 130-2. MME 130-3 may send a load message 610-3 to MMEs 130-1 and 130-2. Load message 610-3 may include a momentary load (e.g., estimated load 320-3) associated with MME 130-3. In one example, MMEs 130 may exchange load messages 610 at regular intervals. In another example, each of MMEs 130 may provide a load message 610 to other MMEs 130 in MME pool 190 in response to an event (e.g., detection of an overload), when a load (e.g., associated with the particular MME 130) changes more than a particular threshold during a particular time interval, when a load (e.g., associated with the particular MME 130) meets or exceeds a threshold, and/or in response to other events. MMEs 130 may exchange load messages 610 via S10 messages (e.g., that may include a MME identifier, a MME load, and a timestamp).

Figure 7:
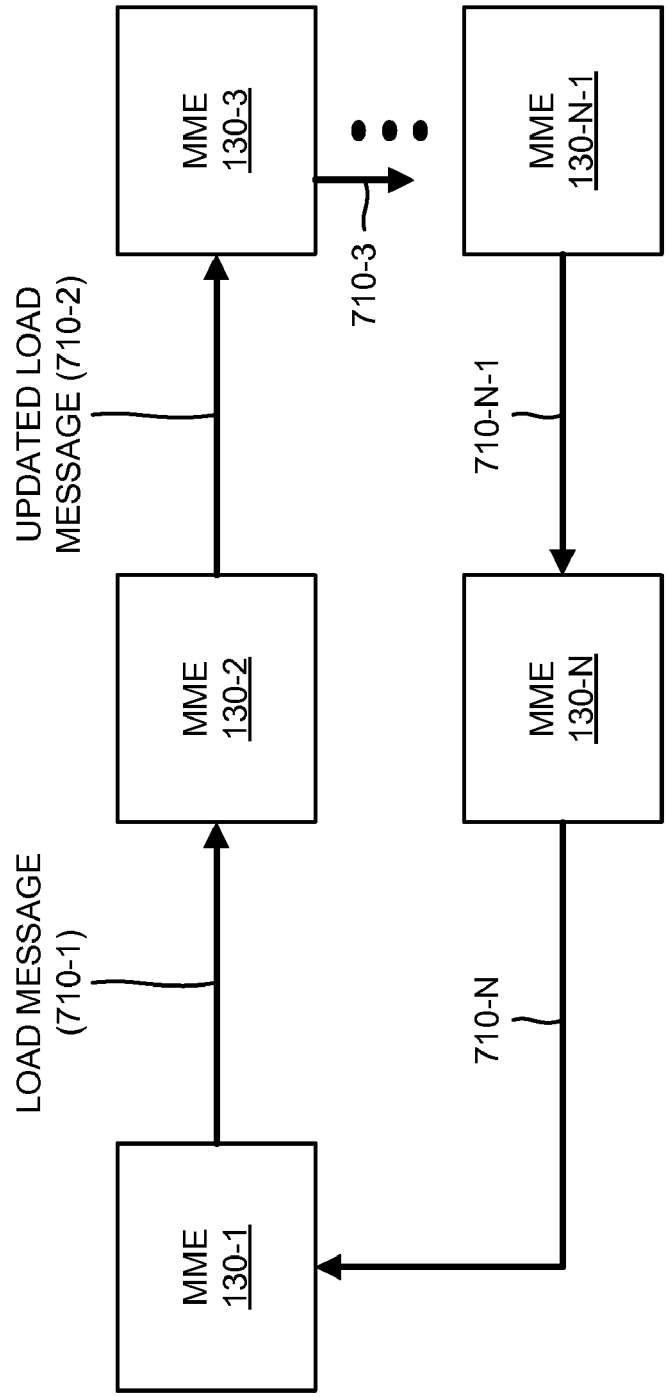

FIG. 7 may depict another exemplary technique for exchanging load information (e.g., load information 310) associated with MMEs 130. As shown, exemplary network portion 700 may include MMEs 130-1 through 130-N. MMEs 130-1 through 130-N may define a MME pool (e.g., MME pool 190) and may include the features described above in connection with, for example, FIGS. 1-5. MMEs 130-1 through 130-N may be arranged in a ring topology (e.g., based on S10 interfaces). In one example, the ring topology of MMEs 130 may be self-organized and S10 messages may maintain the topology. In another example, the ring topology of MMEs 130 may be organized based on rules (e.g., defined by an operator or based on MME identification).

As further shown in FIG. 7, one MME 130 (e.g., MME 130-1) in MME pool 190 may generate a load message 710-1, and may provide load message 710-1 to MME 130-2 (e.g., a next MME 130 in the ring topology). Load message 710-1 may be of variable size (e.g., depending on a number of MMEs 130 in MME pool 190), and may include a load associated with MME 130-1, an identifier associated with MME 130-1, and a timestamp. Load message 710-1 may also include fields for other MMEs 130 in MME pool 190 to provide load, identifier, and timestamp information. For example, MME 130-2 may provide its load, identifier, and timestamp information in load message 710-1 (e.g., to create an updated load message 710-2), and may provide updated load message 710-2 to MME 130-3. MME 130-3 may provide its load, identifier, and timestamp information in updated load message 710-2 (e.g., to create a further updated load message 710-3), and the process may continue until MME 130-N provides a load message 710-N (e.g., which may include loads, identifiers, and timestamps for all MMEs 130) to MME 130-1. In this way, each MME 130 in the ring topology may provide its load information to other MMEs 130.

Figure 8:
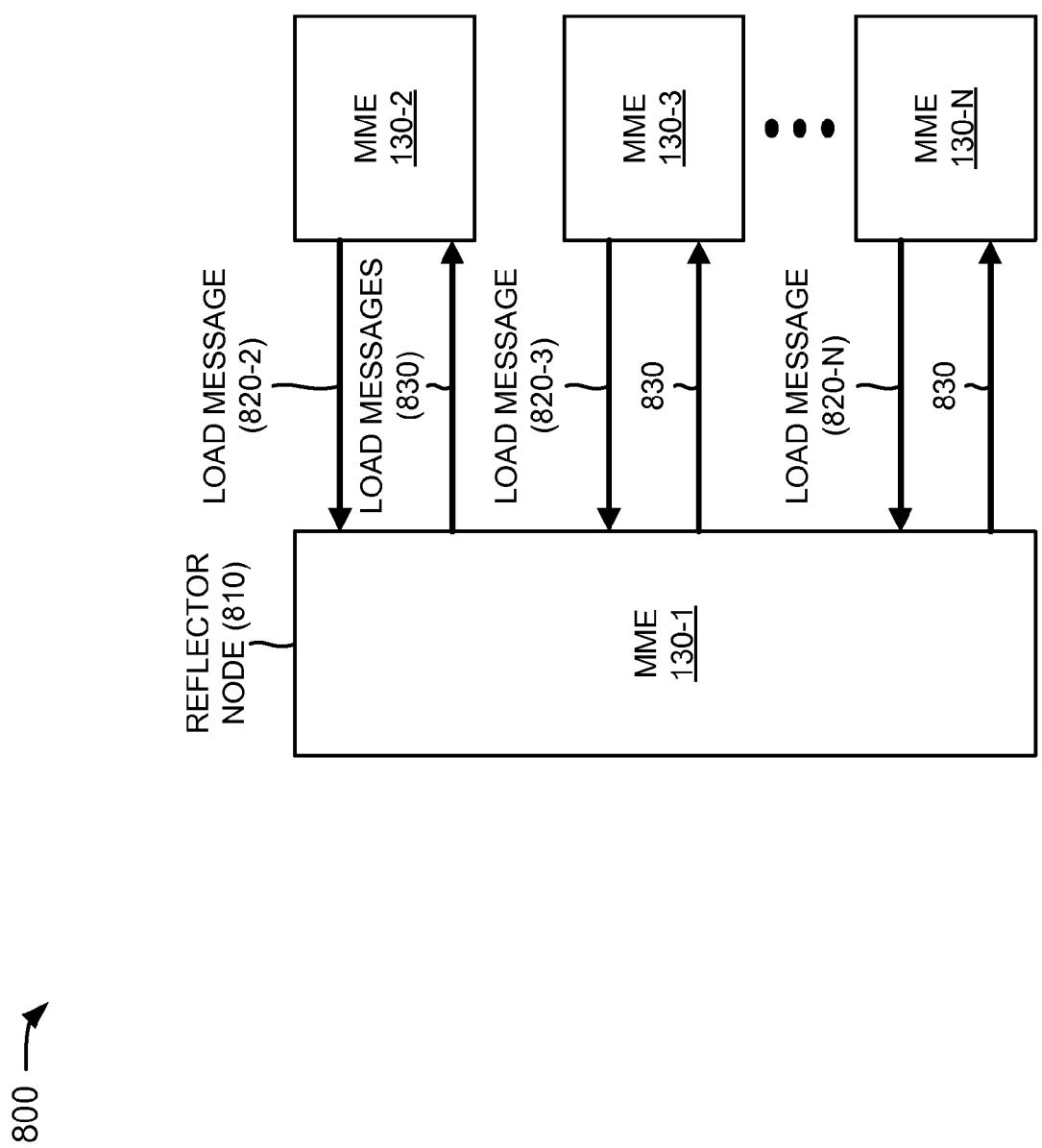

FIG. 8 may depict still another exemplary technique for exchanging load information (e.g., load information 310) associated with MMEs 130. As shown, exemplary network portion 800 may include MMEs 130-1 through 130-N. MMEs 130-1 through 130-N may define a MME pool (e.g., MME pool 190) and may include the features described above in connection with, for example, FIGS. 1-5. As further shown, one of MMEs 130 (e.g., MME 130-1) may be designated as a reflector node 810. In one example, reflector node 810 may make load balancing decisions on behalf of MME pool 190, and may receive load messages 820 from MMEs 130-2 through MME 130-N. For example, MME 130-2 may provide a load message 820-2 to reflector node 810, MME 130-3 may provide a load message 820-3 to reflector node 810, and MME 130-N may provide a load message 820-N to reflector node 810. Each of load messages 820 may include a MME identifier, a MME load, and a timestamp.

Reflector node 810 may receive load messages 820, may concatenate load messages 820 to produce concatenated load messages 830, and may provide concatenated load messages 830 to MMEs 130-2 through 130-N. In one example, reflector node 810 may concatenate load messages 820 to produce concatenated load messages 830 as described above in connection with FIG. 7 (e.g., reflector node 810 may create a single load message that includes load, identifier, and timestamp information associated with MMEs 130-1 through 130-N). In another example, reflector node 810 may concatenate load messages 820 to produce concatenated load messages 830 by replicating load messages 820 (e.g., maintaining message structures of load messages 820). In order to not overload reflector node 810 with load messages 820, in one example, MMEs 130-2 through 130-N may employ timing mechanisms for sending load messages 820 (e.g., according to a randomly chosen time interval, according to a fixed order based on the MME identifiers, etc.). In this way, MMEs 130 may convey their load information to other MMEs 130.

Figure 9:
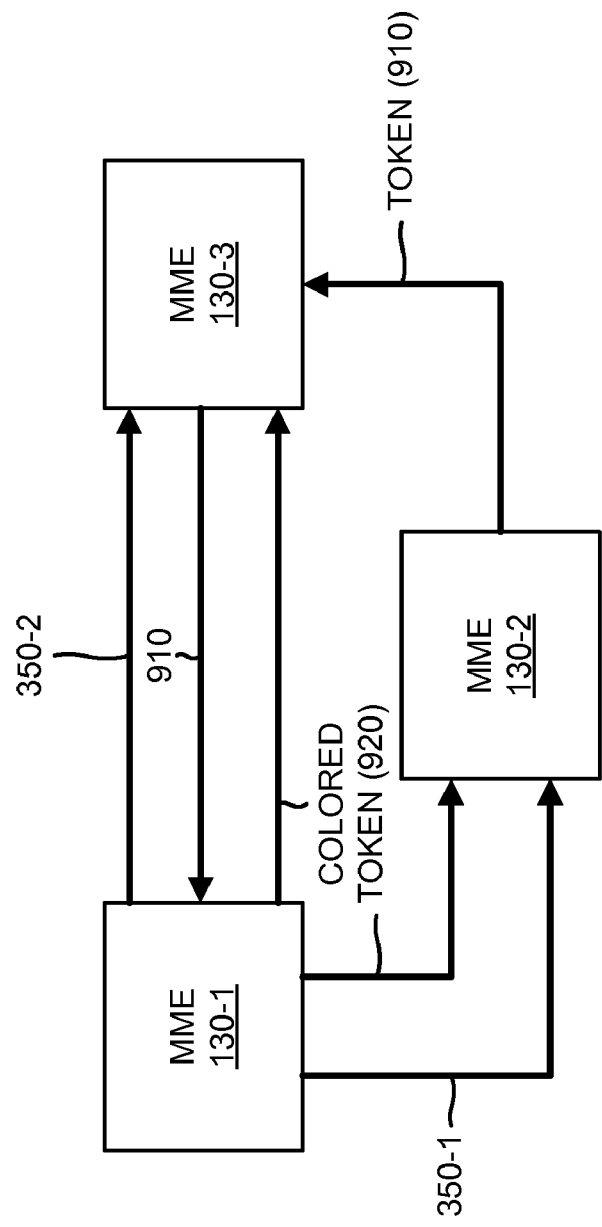
Figure 10:
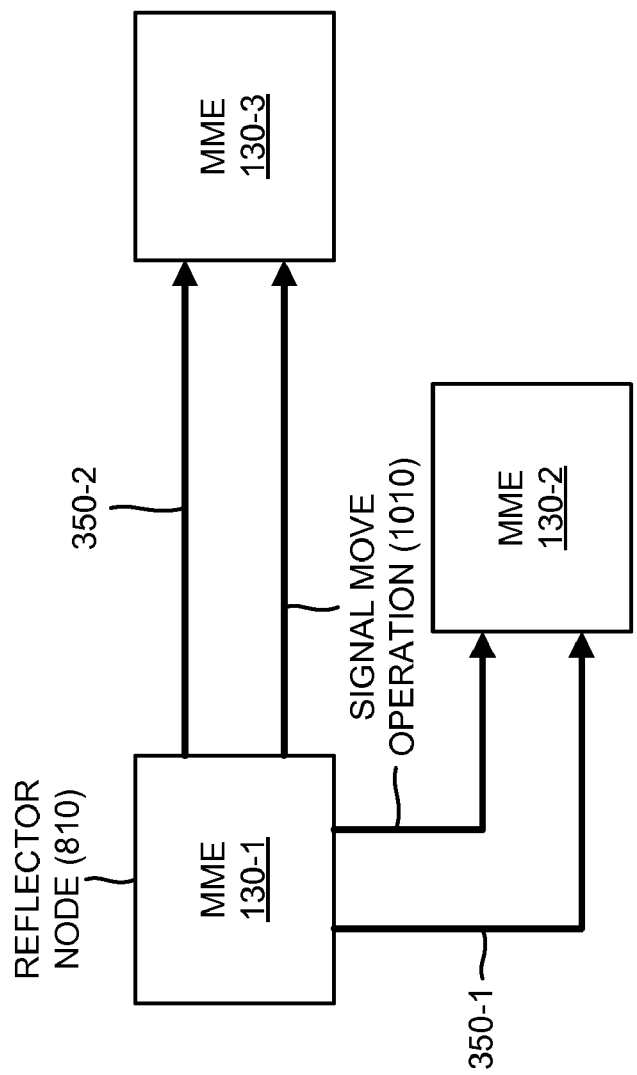
Figure 11:
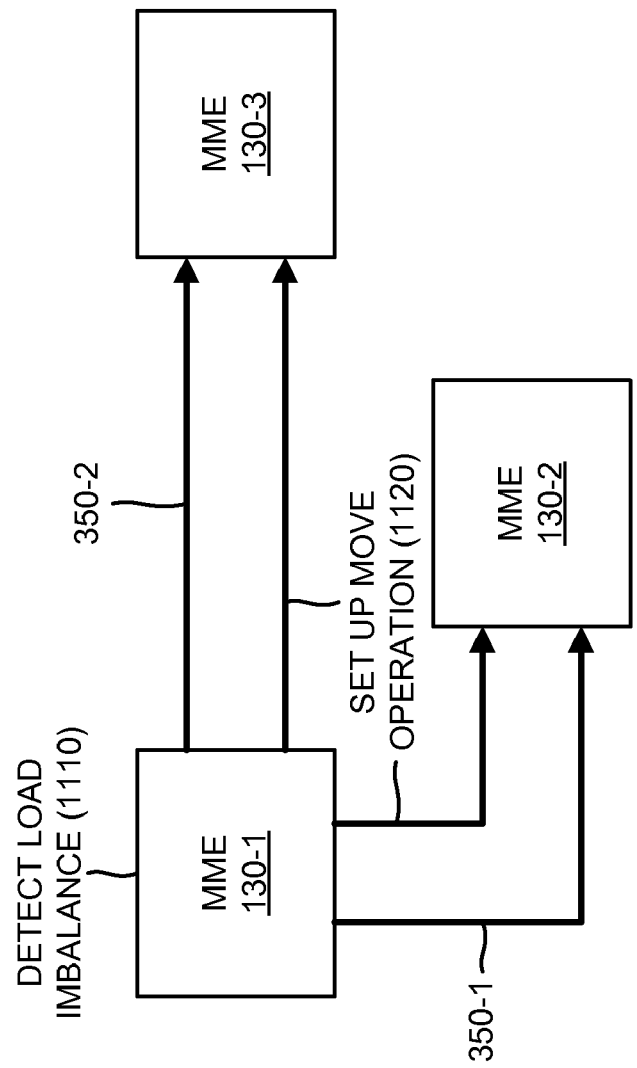

FIGS. 9-11 depict exemplary techniques for performing a move operation (e.g., a redistributing load operation) that may ensure that only a single move operation is being performed at a particular moment in time. It may be assumed, with respect to FIGS. 9-11, that all MMEs 130 simultaneously have access to other MMEs 130 load information, and that all MMEs 130 evaluate a need for performing a load rebalancing operation in a similar manner (e.g., via bulk move negotiator 520 and bulk mover 530 (FIG. 5)).

FIG. 9 may depict one exemplary technique for performing a move operation (e.g., a redistributing load operation) associated with MMEs 130. As shown, exemplary network portion 900 may include MMEs 130-1, 130-2, and 130-3. MMEs 130-1, 130-2, and 130-3 may define a MME pool (e.g., MME pool 190) and may include the features described above in connection with, for example, FIGS. 1-5. MME pool 190 may define a token 910 associated with a MME 130 that may perform a move operation during a particular time interval. In this example, it may be assumed that token 910 indicates that MME 130-1 may perform a move operation. Token 910 may be passed around to each MME 130 of MME pool 190 after being held for the particular time interval in each MME 130. For example, MME 130-2 may provide token 910 to MME 130-3 (e.g., after the particular time interval), and MME 130-3 may provide token 910 to MME 130-1 (e.g., after the particular time interval). The order of passing token 910 may vary and token 910 may be fairly provided to each MME 130 in MME pool 190. In one example, each MME 130 may pass token 910 to one of its neighbor MMEs 130 according to a pre-defined order (e.g., as specified by an operator, based on the MME identifier, etc.). In another example, each MME 130 may randomly provide token 910 to another MME 130 in MME pool 190.

As further shown in FIG. 9, MME 130-1 (e.g., which may begin a move operation) may receive token 910, and may begin the move operation based on receipt of token 910. For example, MME 130-1 may offload a portion of the determined subscribers (e.g., the load) to MME 130-2, as indicated by reference number 350-1, and/or may offload a portion of the determined subscribers (e.g., the load) to MME 130-3, as indicated by reference number 350-2.

Performing a move operation may take time, depending on a number of users (e.g., UEs 110) served by a particular MME 130 performing the move and a maximum moving rate associated with the particular MME 130. Because users may migrate between MMEs 130 during a move operation, loads on MMEs 130 may vary during the move operation. To take this into account, MMEs 130 that are involved in a move operation may temporarily suspend exchanging load information, or may ignore load information received during the move operation.

To address load variations on MMEs 130-1, 130-2, and/or 130-3 during the move operation, exemplary network portion 900 may introduce a colored token 920 (e.g., provided by MME 130-1 to MMEs 130-2 and 130-3). Colored token 920 may cause MMEs 130-2 and 130-3 to temporarily suspend exchanging load information or to ignore load information received during the move operation. In one example, a pre-defined color order and transition rules (e.g., for colored token 920) may specify conditions that permit changing colors of a token. This may include having a virtual stack of tokens that correspond to operations being carried out or temporarily suspended (e.g., by MMEs 130) because higher-priority operations are occurring. Colored token 920 may be passed around as described above, but only the MME (e.g., MME 130-1) that changes a color of colored token 920 may have a right to either upgrade or downgrade the token color once an operation is finalized. In this way, MMEs 130-2 and 130-3 may temporarily suspend exchanging load information or may ignore load information received during the move operation.

FIG. 10 may depict another exemplary technique for performing a move operation (e.g., a redistributing load operation) associated with MMEs 130. As shown, exemplary network portion 1000 may include MMEs 130-1, 130-2, and 130-3. MMEs 130-1, 130-2, and 130-3 define a MME pool (e.g., MME pool 190) and may include the features described above in connection with, for example, FIGS. 1-5. As further shown, MME 130-1 may be designated as reflector node 810 (FIG. 8).

According to the exemplary technique depicted in FIG. 10, reflector node 810 (e.g., MME 130-1) may be the only MME 130 that may begin a move operation. For example, reflector node 810 may signal a move operation to MMEs 130-2 and 130-3, as indicated by reference number 1010. Reflector node 810 may offload a portion of the determined subscribers (e.g., the load) to MME 130-2, as indicated by reference number 350-1, and/or may offload a portion of the determined subscribers (e.g., the load) to MME 130-3, as indicated by reference number 350-2. Reflector node 810 may inform (e.g., via signaling) other MMEs 130 in MME pool 190 about a type operation to be performed (or when a change in the type of operation is required). Such signaling may suspend performance of other operations by the other MMEs 130 (e.g., based on a priority order defined by an operator).

FIG. 11 may depict still another exemplary technique for performing a move operation (e.g., a redistributing load operation) associated with MMEs 130. As shown, exemplary network portion 1100 may include MMEs 130-1, 130-2, and 130-3. MMEs 130-1, 130-2, and 130-3 may define a MME pool (e.g., MME pool 190) and may include the features described above in connection with, for example, FIGS. 1-5.

Due to transmission delays, it may not be possible for all MMEs 130 to receive the same information at exactly the same time. According to the exemplary technique depicted in FIG. 11, a first MME 130 (e.g., MME 130-1) that detects a load imbalance, as indicated by reference number 1110, may be designated as a semaphore (e.g., a device that coordinates or synchronizes multiple processes competing for the same resources) for MME pool 190. The semaphore (e.g., MME 130-1) may permit synchronization throughout MME pool 190 regarding a type of operation to be performed. Once a semaphore is designated, the semaphore may need to be released before another type of operation is performed. For example, MME 130-1 may contact the other MMEs 130 (e.g., MMEs 130-2 and 130-3) and may attempt to set up a move operation, as indicated by reference number 1120. Concurrent attempts to set up the move operation by multiple MMEs 130 may be resolved by using a timestamp (e.g., and the MME identification) associated with the attempts. As further shown in FIG. 11, MME 130-1 may offload a portion of the determined subscribers (e.g., the load) to MME 130-2, as indicated by reference number 350-1, and/or may offload a portion of the determined subscribers (e.g., the load) to MME 130-3, as indicated by reference number 350-2.

Although FIGS. 6-11 show exemplary components of network portions 600-1100, in other implementations, network portions 600-1100 may contain fewer, different, differently arranged, or additional components than depicted in FIGS. 6-11. Additionally or alternatively, one or more components of network portions 600-1100 may perform one or more other tasks described as being performed by one or more other components of network portions 600-1100.

Figure 12:
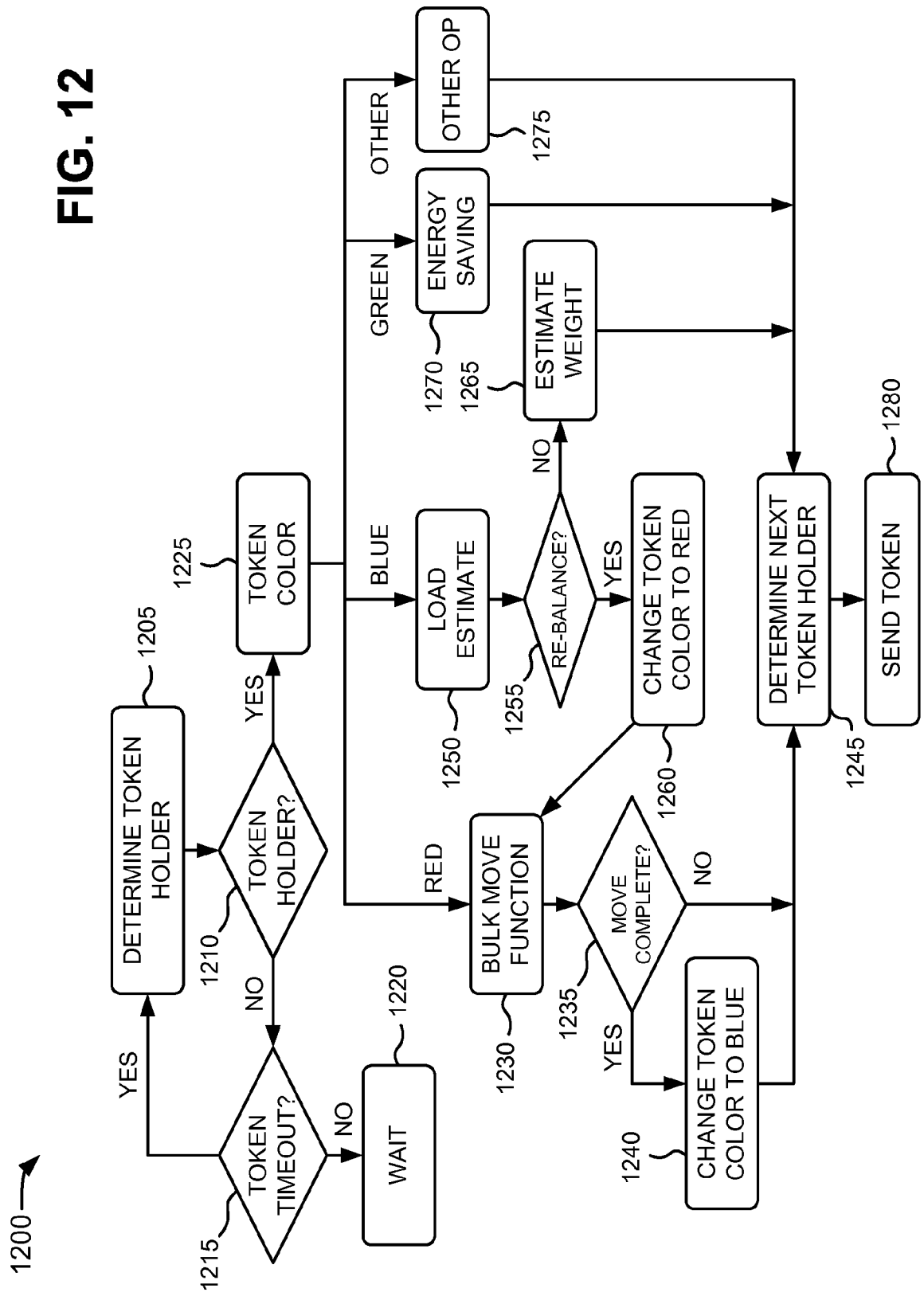
FIG. 12 depicts a flow chart of an exemplary token-based process for self-management of a MME pool according to embodiments described herein.

FIG. 12 depicts a flow chart of an exemplary token-based process 1200 for self-management of a MME pool according to embodiments described herein. In one embodiment, process 1200 may be performed by one of MMEs 130 (e.g., MME 130-1). In other embodiments, some or all of process 1200 may be performed by another device or group of devices (e.g., communicating with one of MMEs 130).

With regard to process 1200, it may be assumed that existing users (e.g., UEs 110) are distributed among MMEs 130 in a balanced way, and that new users may be added to MME pool 190 so that a proper balance may be maintained between MMEs 130. While operating under normal conditions, MME pool 190 may assumed to be balanced. Therefore, under normal conditions, MMEs 130 may exchange load information without a need to re-balance. Process 1200 may use colored tokens to distinguish between multiple categories of pool management operations (e.g., re-balancing, monitoring load, etc.) that may be performed simultaneously within MME pool 190.

As illustrated in FIG. 12, process 1200 may include MME 130 (e.g., MME 130-1) determining if MME 130-1 is a token holder (block 1205). If MME 130-1 is not a token holder (block 1210—NO), MME 130-1 may determine if the token has timed out (block 1215). If the token has timed out (block 1215—YES), MME 130-1 may once again determine if it is a token holder (block 1205). If the token has not timed out (block 1215—NO), MME 130-1 may wait until the token has timed out (block 1220). If MME 130-1 is a token holder (block 1210—YES), MME 130-1 may determine a color of the token (block 1225).

As further shown in FIG. 12, if MME 130-1 determines that the token is red, MME 130-1 may perform a bulk move function (e.g., a move operation) (block 1230). If MME 130-1 determines that the move is complete (block 1235—YES), MME 130-1 may change the token color to blue (block 1240). If MME 130-1 determines that the move is not complete (block 1235—NO), MME 130-1 may determine a next token holder (block 1245). For example, in embodiments described above in connection with FIG. 3, MME 130-1 may determine a number of subscribers (e.g., UEs 110 associated with MME 130-1) to offload from MME 130-1 (e.g., to address the load imbalance), and may determine to which other MMEs 130 in MME pool 190 to offload the subscribers. In one example, MME 130-1 may determine that a particular number of subscribers should be offloaded from MME 130-1 and provided to MMEs 130-2 and/or 130-3. MME 130-1 may redistribute or offload a portion of the determined subscribers (e.g., the load) to MME 130-2, as indicated by reference number 350-1, and/or may redistribute or offload a portion of the determined subscribers (e.g., the load) to MME 130-3, as indicated by reference number 350-2.

Returning to FIG. 12, if MME 130-1 determines that the token is blue, MME 130-1 may perform a load estimate (block 1250). If MME 130-1 determines that a re-balance is needed (block 1255—YES), MME 130-1 may change the token color to red (block 1260) and process 1200 may proceed to block 1230 (e.g., the move operation). If MME 130-1 determines that the re-balance is not needed (block 1255—NO), MME 130-1 may estimate its weight (block 1265) and process 1200 may proceed to block 1245. For example, in embodiments described above in connection with FIG. 3, MME 130-1 may estimate its load 320-1 based on load information 310-1. MME 130-1 may estimate its weight 330-1 in MME pool 190 based on estimated load 320-1, and may advertise estimated weight 330-1 to MME 130-2 and MME 130-3. MME 130-1 may detect a load imbalance in MME pool 190 (e.g., MME 130-1 may be overloaded) based on estimated weight 330-1 and weights 330-2 and 330-3 associated with MMEs 130-2 and 130-3, respectively, and may perform a load re-balance.

As further shown in FIG. 12, if MME 130-1 determines that the token is green, MME 130-1 may perform an energy saving operation (block 1270) and process 1200 may proceed to block 1245. In one example, MME 130-1 may attempt to save energy by minimizing its load (e.g., by shutting down MME 130-1, shutting down non-essential components within MME 130-1, etc.). If MME 130-1 determines that the token is another color, MME 130-1 may perform another operation (e.g., NAS signaling security) (block 1275) and process 1200 may proceed to block 1245. After determining a next token holder (block 1245), MME 130-1 may send the token to one or more other MMEs 130 in MME pool 190 (block 1280).

In embodiments described herein, MMEs 130 may exchange a variety of messages (e.g., load information, negotiation of bulk moves, etc.) over S10 interfaces connecting MMEs 130. The following tables present exemplary types of messages that MMEs 130 may exchange over the S10 interfaces.

TABLE 1

Information Elements (IEs) in a Pool Notification

| Information elements | Condition/Comment | IE Type |
|---|---|---|
| Pool Id | IE may be used to identify a pool | string |
| Token Holder Id | IE may be used to identify the device in the pool that is currently holding the token and sending load information | string |
| Inter-Notification Interval | IE may be used to determine the time between consecutive Load Notification messages | U32 |
| Pool Member Info | IE may be used to describe the load on the devices within the pool. The total number of Load Info IEs in a Load Notification IE can be smaller than the total number of devices in the pool, but may not be larger than this number. In case it is smaller, the load on those devices is considered unchanged from the previous Load Notification received. The format of this IE is described in Table 2. | Pool Memberh |

TABLE 2

Information Elements in Pool Member Info

| Information elements | Condition/Comment | IE Type |
|---|---|---|
| MME Id | IE may be used to identify a MME | string |
| Load | IE may be used to describe the load information | string |
| Weight | IE may be used to describe the weight information | U8 |
| Status | IE may be used to indicate what is the operational state of the device | string |
| Token Timeout Interval | IE may be used to determine the timeout interval after which an MME may consider that the token holder is no longer active and proceed to electing a new token master | U32 |

TABLE 3

Information Elements in a Pool Notification Acknowledge

| Information elements | Condition/Comment | IE Type |
|---|---|---|
| Cause | None | Cause |
| Recovery | None | Recovery |

TABLE 4

Information Elements in a Pool Notification

| Information elements | Condition/Comment | IE Type |
|---|---|---|
| Pool Id | IE may be used to identify a pool | string |
| Token Id | IE may be used to identify the token. The format of this IE is described in Table 2. | Token |
| Inter-Notification Interval | IE may be used to determine the time between consecutive Load Notification messages | U32 |
| Pool Member Info | IE may be used to describe the load on the devices within the pool. The total number of Load Info IEs in a Load Notification IE can be smaller than the total number of devices in the pool, but may not be larger than this number. In case it is smaller, the load on those devices is considered unchanged from the previous Load Notification received. The format of this IE is described in Table 3. | Pool Member |

TABLE 5

Information Elements for a Token

| Information elements | Condition/Comment | IE Type |
|---|---|---|
| Token Id | IE may be used to identify the token | string |
| Token Holder Id | IE may be used to identify the device in the pool that is currently holding the token and sending load information | string |
| Token color | IE may be used to describe the operation currently performed within the pool. | string |
| Token Timeout Interval | IE may be used to determine the timeout interval after which an MME would consider that the token holder is no longer active and proceed to electing a new token master | U32 |

TABLE 6

Information Elements in Pool Member Info

| Information elements | Condition/Comment | IE Type |
| --- | --- | --- |
| MME Id | IE may be used to identify a MME | string |
| Load | IE may be used to describe the load information | string |
| Weight | IE may be used to describe the weight information | U8 |
| Status | IE may be used to indicate what is the operational state of the device | string |

TABLE 7

Information Elements in a Pool Notification Acknowledge

| Information elements | Condition/Comment | IE Type |
| --- | --- | --- |
| Cause | None | Cause |
| Recovery | None | Recovery |

TABLE 8

Information Elements in a Bulk Move Notification

| Information elements | Condition/Comment | IE Type |
| --- | --- | --- |
| MME Id Source | IE may be used to identify the MME source of the moves | string |
| MME Id Destination | IE may be used to identify the MME destination of the moves | string |
| # of moves | IE may be used to describe the number of users to be moved | U32 |
| Bulk Move Strategy | IE may be used to choose the policy rule to apply when determining types of users to be moved | string |
| Status | IE may be used to indicate what is the status of the bulk move operation (to be started, performed, in progress, etc.) | string |

TABLE 9

Information Elements in a Bulk Move Acknowledge

| Information elements | Condition/Comment | IE Type |
| --- | --- | --- |
| Cause | None | Cause |
| Recovery | None | Recovery |

FIGS. 13-17 illustrate flow charts of an exemplary process 1300 for self-management of a MME pool according to embodiments described herein. In one embodiment, process 1300 may be performed by one of MMEs 130 (e.g., MME 130-1). In other embodiments, some or all of process 1300 may be performed by another device or group of devices (e.g., communicating with one of MMEs 130).

Figure 13:
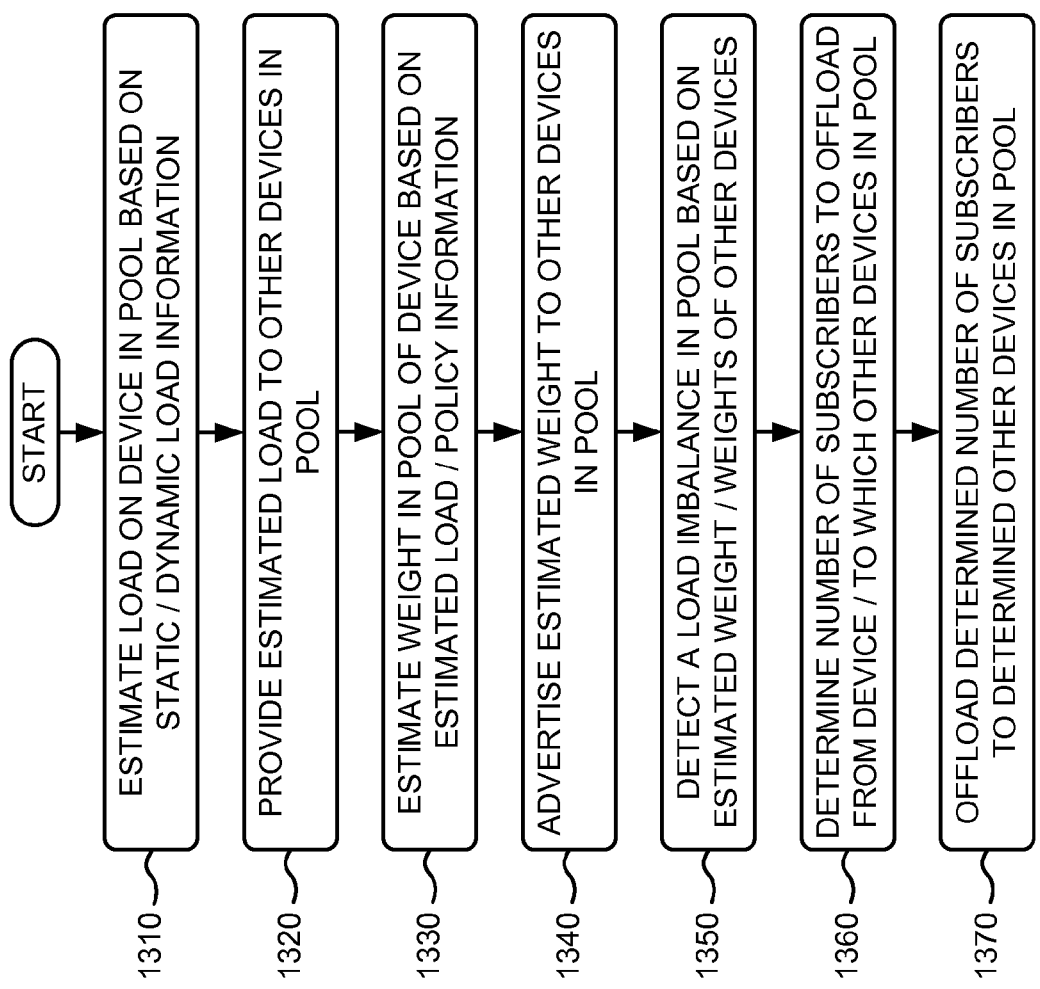

As illustrated in FIG. 13, process 1300 may include estimating a load on a device in a pool of devices based on static and/or dynamic load information (block 1310), and providing the estimated load to other devices in the pool (block 1320). For example, in embodiments described above in connection with FIG. 3, each of MMEs 130 may estimate its own load based on load information 310, and may provide the estimated load to other MMEs 130 in MME pool 190. For example, MME 130-1 may estimate its load 320-1 based on load information 310-1, and may provide its estimated load 320-1 to MME 130-2 and MME 130-3. MME 130-2 may estimate its load 320-2 based on load information 310-2, and may provide its estimated load 320-2 to MME 130-1 and MME 130-3. MME 130-3 may estimate its load 320-3 based on load information 310-3, and may provide its estimated load 320-3 to MME 130-1 and MME 130-2. In one example, each MME 130 may exchange estimated loads 320 simultaneously with other MMEs 130 in MME pool 190. In another example, MME 130-1 may provide estimated load 320-1 to MMEs 130-2 and 130-3 at a first time, MME 130-2 may provide estimated load 320-2 to MMEs 130-1 and 130-3 at a second time (e.g., different than the first time), and MME 130-3 may provide estimated load 320-3 to MMEs 130-1 and 130-3 at a third time (e.g., different than the first and second times).

As further shown in FIG. 13, a weight of the device in the pool may be estimated based on estimated load and/or policy information (block 1330), and the estimated weight may be advertised to other devices in the pool (block 1340). For example, in embodiments described above in connection with FIG. 3, each of MMEs 130 may estimate its weight in MME pool 190 based on estimated load 320 and/or other information (e.g., policy information, estimated loads 320 of other MMEs 130), and may advertise the estimated weight to other MMEs 130 in MME pool 190. For example, MME 130-1 may estimate its weight 330-1 in MME pool 190 based on estimated loads 320-1, 320-2, and 320-3, and may advertise estimated weight 330-1 to MME 130-2 and MME 130-3. MME 130-2 may estimate its weight 330-2 in MME pool 190 based on estimated loads 320-1, 320-2, and 320-3, and may advertise estimated weight 330-2 to MME 130-1 and MME 130-3. MME 130-3 may estimate its weight 330-3 in MME pool 190 based on estimated loads 320-1, 320-2, and 320-3, and may advertise estimated weight 330-3 to MME 130-1 and MME 130-2.

Returning to FIG. 13, a load imbalance in the pool may be detected based on the estimated weight and the weights of the other devices (block 1350), a number of subscribers to offload from the device and to which other devices to offload the subscribers may be determined (block 1360), and the determined number of subscribers may be offloaded to the determined other devices in the pool (block 1370). For example, in embodiments described above in connection with FIG. 3, MME 130-1 may detect a load imbalance in MME pool 190 (e.g., MME 130-1 may be overloaded) based on estimated weight 330-1 and weights 330-2 and 330-3 associated with MMEs 130-2 and 130-3, respectively. MME 130-1 may determine a number of subscribers (e.g., UEs 110 associated with MME 130-1) to offload from MME 130-1 (e.g., to address the load imbalance), and may determine to which other MMEs 130 in MME pool 190 to offload the subscribers. MME 130-1 may redistribute or offload a portion of the determined subscribers (e.g., the load) to MME 130-2, as indicated by reference number 350-1, and/or may redistribute or offload a portion of the determined subscribers (e.g., the load) to MME 130-3, as indicated by reference number 350-2.

Figure 14:
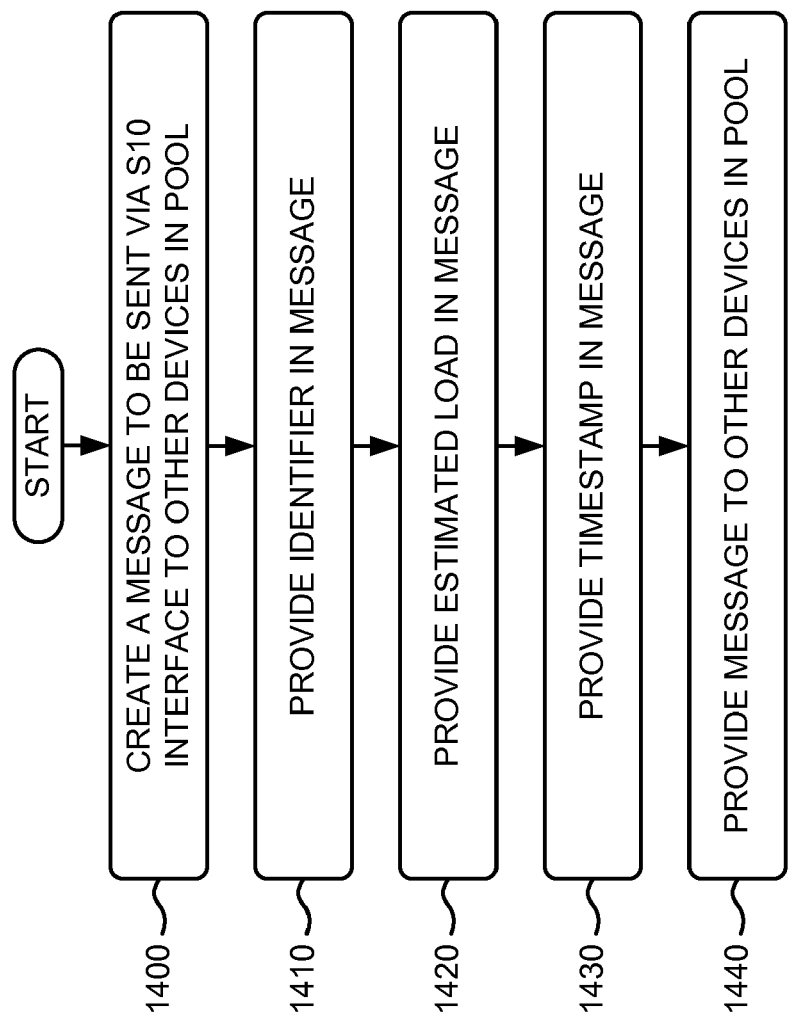

Process block 1320 may include the process blocks depicted in FIG. 14. As illustrated in FIG. 14, process block 1320 may include creating a message to be sent via a S10 interface to the other devices in the pool (block 1400), providing an identifier in the message (block 1410), providing the estimated load in the message (block 1420), providing a timestamp in the message (block 1430), and providing the message to the other devices in the pool (block 1440). For example, in embodiments described above in connection with FIG. 6, each of MMEs 130 may send particular load messages 610 to every other MME 130 in MME pool 190. For example, MME 130-1 may send load message 610-1 to MMEs 130-2 and 130-3. Load message 610-1 may include a momentary load (e.g., estimated load 320-1) associated with MME 130-1. In one example, MMEs 130 may exchange load messages 610 at regular intervals. In another example, each of MMEs 130 may provide load message 610 to other MMEs 130 in MME pool 190 in response to an event (e.g., detection of an overload), when a load (e.g., associated with the particular MME 130) changes more than a particular threshold during a particular time interval, when a load (e.g., associated with the particular MME 130) meets or exceeds a threshold, and/or in response to other events. MMEs 130 may exchange load messages 610 via S10 messages (e.g., that may include a MME identifier, a MME load, and a timestamp).

Figure 15:
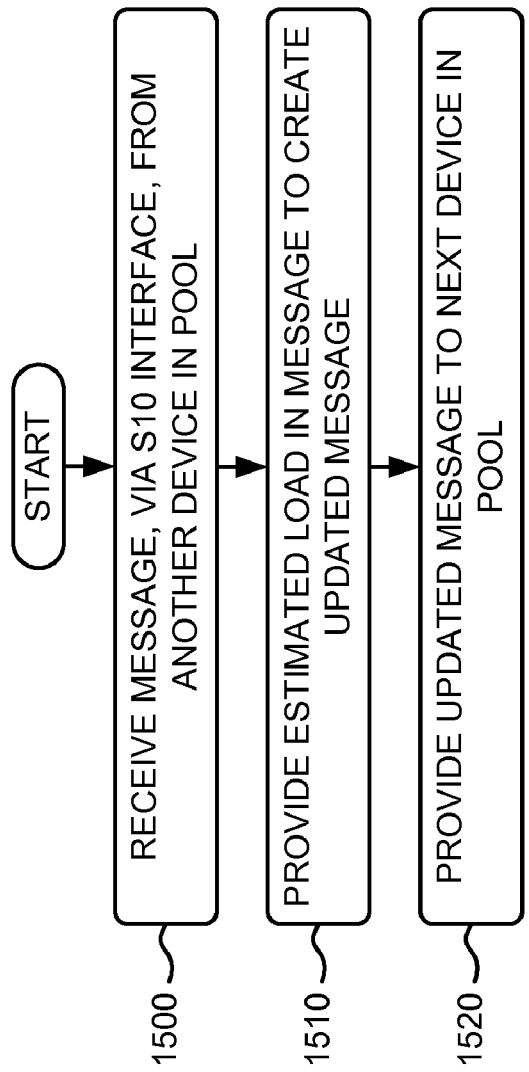

Process block 1320 may include the process blocks depicted in FIG. 15. As illustrated in FIG. 15, process block 1320 may include receiving a message, via an S10 interface, from another device in the pool (block 1500), providing the estimated load in the message to create an updated message (block 1510), and providing the updated message to a next device in the pool (block 1520). For example, in embodiments described above in connection with FIG. 7, one MME 130 (e.g., MME 130-1) in MME pool 190 may generate load message 710-1, and may provide load message 710-1 to MME 130-2 (e.g., a next MME 130 in the ring topology). Load message 710-1 may be of variable size (e.g., depending on a number of MMEs 130 in MME pool 190), and may include a load associated with MME 130-1, an identifier associated with MME 130-1, and a timestamp. Load message 710-1 may also include fields for other MMEs 130 in MME pool 190 to provide load, identifier, and timestamp information. MME 130-2 may provide its load, identifier, and timestamp information in load message 710-1 (e.g., to create updated load message 710-2), and may provide updated load message 710-2 to MME 130-3.

Figure 16:
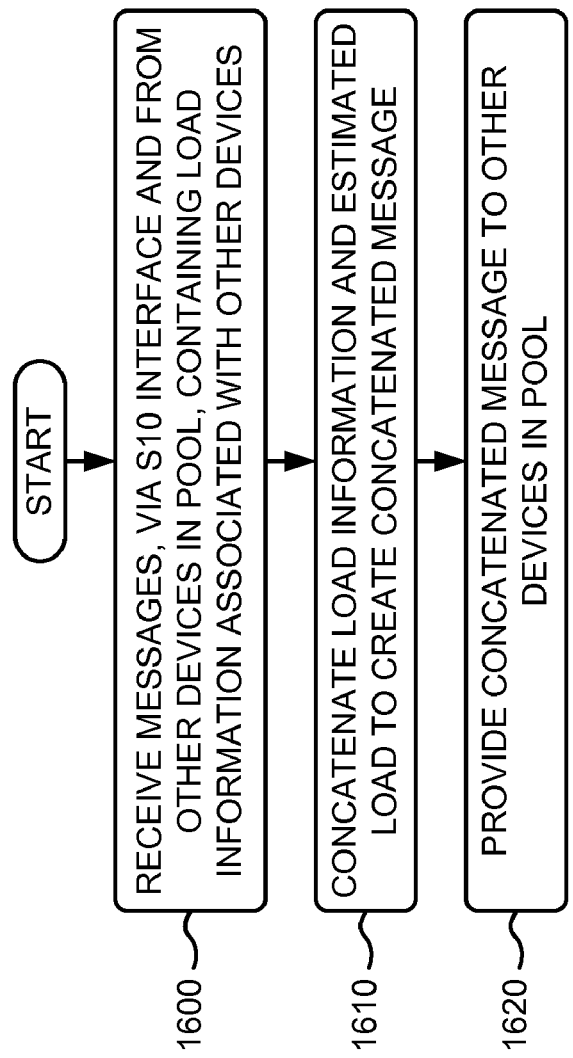

Process block 1320 may include the process blocks depicted in FIG. 16. As illustrated in FIG. 16, process block 1320 may include receiving messages, via an S10 interface and from the other devices in the pool, containing load information associated with the other devices (block 1600), concatenating the load information and the estimated load to create a concatenated message (block 1610), and providing the concatenated message to the other devices in the pool (block 1620). For example, in embodiments described above in connection with FIG. 8, reflector node 810 may receive load messages 820, may concatenate load messages 820 to produce concatenated load messages 830, and may provide concatenated load messages 830 to MMEs 130-2 through 130-N. In one example, reflector node 810 may concatenate load messages 820 to create a single load message that includes load, identifier, and timestamp information associated with MMEs 130-1 through 130-N. In another example, reflector node 810 may concatenate load messages 820 to produce concatenated load messages 830 by replicating load messages 820 (e.g., maintaining message structures of load messages 820).

Process block 1370 may include the process blocks depicted in FIG. 17. As illustrated in FIG. 17, process block 1370 may include offloading the determined number of subscribers to the determined other devices in the pool when a token is received (block 1700), offloading the determined number of subscribers to the determined other devices in the pool when the device is a reflector node (block 1710), or offloading the determined number of subscribers to the determined other devices in the pool when the device detects an imbalance (block 1720). For example, in embodiments described above in connection with FIG. 9, MME pool 190 may define token 910 associated with a MME 130 that may begin a move operation during a particular time interval. Token 910 may indicate that MME 130-1 may perform a move operation. Token 910 may be passed around to each MME 130 of MME pool 190 after being held for the particular time interval in each MME 130. MME 130-1 (e.g., which may perform a move operation) may receive token 910, and may begin the move operation based on receipt of token 910. In embodiments described above in connection with FIG. 10, reflector node 810 (e.g., MME 130-1) may be the only MME 130 that may perform a move operation. Reflector node 810 may signal a move operation to MMEs 130-2 and 130-3, as indicated by reference number 1010. In embodiments described above in connection with FIG. 11, a first MME 130 (e.g., MME 130-1) that detects a load imbalance, as indicated by reference number 1110, may be designated as a semaphore for MME pool 190. The semaphore (e.g., MME 130-1) may permit synchronization throughout MME pool 190 regarding a type of operation to be performed. In one example, MME 130-1 may contact the other MMEs 130 (e.g., MMEs 130-2 and 130-3) and may attempt to set up a move operation, as indicated by reference number 1120.

Systems and/or methods described herein may provide a decentralized approach for MME pool management. As such, the MME pool may automatically balance loads between MMEs, and therefore, may become self managing. The systems and/or methods may provide pool management functionality to each MME in a MME pool. The pool management functionality may include a load estimator function to estimate a load on a MME, and a weight estimator function to estimate a weight of the MME in the MME pool and to automatically recalculate the weight based on changing load conditions in the MME pool. The pool management functionality may also include a bulk move negotiation function to determine a number of subscribers to offload from the MME, and a bulk move function to offload the subscribers to other MMEs in the MME pool. The weight estimator function and the bulk move function may prevent load imbalance between the MMEs and may be executed separately or in combination. By automatically recalculating the weight of the MME, new UEs may be served by a least loaded MME. The bulk move function may handle load imbalances quickly since it addresses currently connected UEs, and may enable an overloaded MME to be offloaded. The MMEs in the MME pool may communicate with each other via an extension of 3GPP S10 interfaces associated with the MMEs.

The foregoing description of embodiments provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 12-17, the order of the blocks may be modified in other embodiments. Further, non-dependent blocks may be performed in parallel.

It should be emphasized that the term "comprises/comprising" when used in this specification is taken to specify the presence of stated features, integers, steps or components but does not preclude the presence or addition of one or more other features, integers, steps, components or groups thereof.

It will be apparent that exemplary aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method in a network that includes a device provided in a pool of other devices, the method comprising:
    estimating, by the device, a load on the device based on static and dynamic load information associated with the device;
    providing, by the device, the estimated load to the other devices in the pool;
    estimating, by the device and based on the estimated load, a weight of the device in the pool;
    detecting, by the device, a load imbalance in the pool based on the estimated weight and weights associated with the other devices in the pool;
    determining, by the device and based on the estimated load, a number of subscribers to offload from the device;
    determining, by the device and based on the estimated weight and the weights associated with the other devices, to which of the other devices to offload the determined number of subscribers; and
    offloading, by the device and to address the load imbalance, the determined number of subscribers to the determined other devices in the pool,
    where the dynamic load information includes one or more of:
    a number of active calls associated with the device,
    a number of active sessions associated with the device, or
    a number of tracking area u date (TAU) procedures associated with the device.

2. The method of claim 1, where the device includes a mobility management entity (MME) provided in a pool of other MMEs.

3. The method of claim 1, where the static load information includes a number of users registered with the device.

4. A method in a network that includes a device provided in a pool of other devices, the method comprising:
    estimating, by the device, a load on the device based on static and dynamic load information associated with the device;
    providing, by the device, the estimated load to the other devices in the pool;
    estimating, by the device and based on the estimated load, a weight of the device in the pool;
    detecting, by the device, a load imbalance in the pool based on the estimated weight and weights associated with the other devices in the pool;
    determining, by the device and based on the estimated load, a number of subscribers to offload from the device;
    determining, by the device and based on the estimated weight and the weights associated with the other devices, to which of the other devices to offload the determined number of subscribers; and
    offloading, by the device and to address the load imbalance, the determined number of subscribers to the determined other devices in the pool,
    where providing the estimated load to the other devices in the pool includes:
    creating a message to be sent to the other devices in the pool,
    providing an identifier in the message,
    providing the estimated load in the message,
    providing a timestamp in the message, and
    providing the message to the other devices in the pool.

5. A method in a network that includes a device provided in a pool of other devices, the method comprising:
    estimating, by the device, a load on the device based on static and dynamic load information associated with the device;
    providing, by the device, the estimated load to the other devices in the pool;
    estimating, by the device and based on the estimated load, a weight of the device in the pool;
    detecting, by the device, a load imbalance in the pool based on the estimated weight and weights associated with the other devices in the pool;
    determining, by the device and based on the estimated load, a number of subscribers to offload from the device;
    determining, by the device and based on the estimated weight and the weights associated with the other devices, to which of the other devices to offload the determined number of subscribers; and
    offloading, by the device and to address the load imbalance, the determined number of subscribers to the determined other devices in the pool,
    where providing the estimated load to the other devices in the pool includes:
    receiving a message from one of the other devices in the pool,
    providing the estimated load in the message to create an updated message, and
    providing the updated message to another one of the other devices in the pool.

6. A method in a network that includes a device provided in a pool of other devices, the method comprising:
    estimating, by the device, a load on the device based on static and dynamic load information associated with the device;
    providing, by the device, the estimated load to the other devices in the pool;
    estimating, by the device and based on the estimated load, a weight of the device in the pool;

detecting, by the device, a load imbalance in the pool based on the estimated weight and weights associated with the other devices in the pool;

determining, by the device and based on the estimated load, a number of subscribers to offload from the device;

determining, by the device and based on the estimated weight and the weights associated with the other devices, to which of the other devices to offload the determined number of subscribers; and offloading, by the device and to address the load imbalance, the determined number of subscribers to the determined other devices in the pool, where providing the estimated load to the other devices in the pool includes:

receiving messages from the other devices in the pool, where the messages include load information associated with the other devices, concatenating the load information and the estimated load to create a concatenated message, and providing the concatenated message to the other devices in the pool.

7. The method of claim 1, where the number of subscribers to offload from the device is determined when an overload occurs in the device.

8. The method of claim 1, where the number of subscribers to offload from the device is determined to prevent an overload from occurring in the device.

9. A method in a network that includes a device provided in a pool of other devices, the method comprising:

estimating, by the device, a load on the device based on static and dynamic load information associated with the device;

providing, by the device, the estimated load to the other devices in the pool;

estimating, by the device and based on the estimated load, a weight of the device in the pool;

detecting, by the device, a load imbalance in the pool based on the estimated weight and weights associated with the other devices in the pool;

determining, by the device and based on the estimated load, a number of subscribers to offload from the device;

determining, by the device and based on the estimated weight and the weights associated with the other devices, to which of the other devices to offload the determined number of subscribers; and offloading, by the device and to address the load imbalance, the determined number of subscribers to the determined other devices in the pool, where offloading the determined number of subscribers to the determined other devices in the pool includes one of:

offloading the determined number of subscribers to the determined other devices in the pool when a token is received by the device, offloading the determined number of subscribers to the determined other devices in the pool when the device is a reflector node.

10. The method of claim 1, further comprising:

advertising the estimated weight of the device to one or more eNodeBs associated with the device.

11. A device in a network that includes a pool of other devices associated with the device, the device comprising:

a memory to store a plurality of instructions; and a processor to execute instructions in the memory to:

estimate a load on the device based on a number of active calls associated with the device, a number of active sessions associated with the device, or a number of tracking area update (TAU) procedures associated with the device, provide the estimated load to the other devices, estimate, based on the estimated load, a weight of the device in the pool, advertise the estimated weight of the device to the other devices, detect a load imbalance in the pool based on the estimated weight and weights associated with the other devices, determine a number of subscribers to offload from the device based on the estimated load, determine to which of the other devices to offload the determined number of subscribers based on the estimated weight and the weights associated with the other devices, and offload, to address the load imbalance, the determined number of subscribers to the determined other devices in the pool.

12. The device of claim 11, where the device includes a mobility management entity (MME) and each of the other devices includes a MME.

13. A device in a network that includes a pool of other devices associated with the device, the device comprising:

a memory to store a plurality of instructions; and a processor to execute instructions in the memory to:

estimate a load on the device based on one or more of a number of users registered with the device, a number of active calls associated with the device, a number of active sessions associated with the device, or a number of tracking area update (TAU) procedures associated with the device, provide the estimated load to the other devices, estimate, based on the estimated load, a weight of the device in the pool, advertise the estimated weight of the device to the other devices, detect a load imbalance in the pool based on the estimated weight and weights associated with the other devices, determine a number of subscribers to offload from the device based on the estimated load, determine to which of the other devices to offload the determined number of subscribers based on the estimated weight and the weights associated with the other devices, and offload, to address the load imbalance, the determined number of subscribers to the determined other devices in the pool, where, when providing the estimated load to the other devices, the processor is further to execute instructions in the memory to:

create a message to be sent to the other devices, where the message includes an identifier, the estimated load, and a timestamp, and provide the message to the other devices.

14. A device in a network that includes a pool of other devices associated with the device, the device comprising:

a memory to store a plurality of instructions; and a processor to execute instructions in the memory to:

estimate a load on the device based on one or more of a number of users registered with the device, a number of active calls associated with the device, a number of active sessions associated with the device, or a number of tracking area update (TAU) procedures associated with the device, provide the estimated load to the other devices,
estimate, based on the estimated load, a weight of the device in the pool,
advertise the estimated weight of the device to the other devices,
detect a load imbalance in the pool based on the estimated weight and weights associated with the other devices,
determine a number of subscribers to offload from the device based on the estimated load,
determine to which of the other devices to offload the determined number of subscribers based on the estimated weight and the weights associated with the other devices, and
offload, to address the load imbalance, the determined number of subscribers to the determined other devices in the pool,
where, when providing the estimated load to the other devices, the processor is further to execute instructions in the memory to:
receive a message from one of the other devices in the pool, where the message includes at least a load associated with the one of the other devices,
provide the estimated load in the message to create an updated message, and
provide the updated message to at least another one of the other devices in the pool.

15. A device in a network that includes a pool of other devices associated with the device, the device comprising:
a memory to store a plurality of instructions; and
a processor to execute instructions in the memory to:
estimate a load on the device based on one or more of a number of users registered with the device, a number of active calls associated with the device, a number of active sessions associated with the device, or a number of tracking area update (TAU) procedures associated with the device,
provide the estimated load to the other devices,
estimate, based on the estimated load, a weight of the device in the pool,
advertise the estimated weight of the device to the other devices,
detect a load imbalance in the pool based on the estimated weight and weights associated with the other devices,
determine a number of subscribers to offload from the device based on the estimated load,
determine to which of the other devices to offload the determined number of subscribers based on the estimated weight and the weights associated with the other devices, and
offload, to address the load imbalance, the determined number of subscribers to the determined other devices in the pool,
where, when providing the estimated load to the other devices, the processor is further to execute instructions in the memory to:
receive messages from the other devices, where the messages include loads associated with the other devices,
concatenate the loads associated with the other devices and the estimated load to create a concatenated message, and
provide the concatenated message to the other devices.

16. The device of claim 11, where the processor is further to execute instructions in the memory to:
determine the number of subscribers to offload from the device when an overload occurs in the device.

17. The device of claim 11, where the processor is further to execute instructions in the memory to:
determine the number of subscribers to offload from the device in order to prevent an overload from occurring in the device.

18. A device in a network that includes a pool of other devices associated with the device, the device comprising:
a memory to store a plurality of instructions; and
a processor to execute instructions in the memory to:
estimate a load on the device based on one or more of a number of users registered with the device, a number of active calls associated with the device, a number of active sessions associated with the device, or a number of tracking area update (TAU) procedures associated with the device,
provide the estimated load to the other devices,
estimate, based on the estimated load, a weight of the device in the pool,
advertise the estimated weight of the device to the other devices,
detect a load imbalance in the pool based on the estimated weight and weights associated with the other devices,
determine a number of subscribers to offload from the device based on the estimated load,
determine to which of the other devices to offload the determined number of subscribers based on the estimated weight and the weights associated with the other devices, and
offload, to address the load imbalance, the determined number of subscribers to the determined other devices in the pool,
where the processor is further to execute instructions in the memory to one of:
offload the determined number of subscribers to the determined other devices in the pool when a token is received by the device, or
offload the determined number of subscribers to the determined other devices in the pool when the device is a reflector node.

19. A system, comprising:
a pool of mobility management entities (MMEs), where each mobility management entity is to:
estimate a load of the mobility management entity based on static and dynamic load information,
provide the estimated load to the other mobility management entities in the pool of mobility management entities,
estimate, based on the estimated load, a weight of the mobility management entity in the pool,
detect a load imbalance in the pool based on the estimated weight and weights associated with the other mobility management entities,
determine a number of subscribers to offload from the mobility management entity based on the estimated load,
determine to which of the other mobility management entities to offload the determined number of subscribers based on the estimated weight and the weights associated with the other mobility management entities, and
offload, to address the load imbalance, the determined number of subscribers to the determined other mobility management entities,
where, when providing the estimated load to the other mobility management entities, each mobility management entity is further to:

receive a message from one of the other mobility management entities,
provide the estimated load in the message to create an updated message, and
provide the updated message to at least another one of the other mobility management entities.

20. The system of claim 19, where, when providing the estimated load to the other mobility management entities, each mobility management entity is further to:
create a message to be sent to the other mobility management entities, where the message includes the estimated load, and
provide the message to the other mobility management entities.

21. A system, comprising:
a pool of mobility management entities (MMEs), where each mobility management entity is to:
estimate a load of the mobility management entity based on static and dynamic load information,
provide the estimated load to the other mobility management entities in the pool of mobility management entities,
estimate, based on the estimated load, a weight of the mobility management entity in the pool,
detect a load imbalance in the pool based on the estimated weight and weights associated with the other mobility management entities,
determine a number of subscribers to offload from the mobility management entity based on the estimated load,
determine to which of the other mobility management entities to offload the determined number of subscribers based on the estimated weight and the weights associated with the other mobility management entities, and
offload, to address the load imbalance, the determined number of subscribers to the determined other mobility management entities,
where, when providing the estimated load to the other mobility management entities, each mobility management entity is further to:
receive messages from the other mobility management entities, where the messages include loads associated with the other mobility management entities,
concatenate the loads associated with the other mobility management entities and the estimated load to create a concatenated message, and
provide the concatenated message to the other mobility management entities.

22. A system, comprising:
a pool of mobility management entities (MMEs), where each mobility management entity is to:
estimate a load of the mobility management entity based on static and dynamic load information,
provide the estimated load to the other mobility management entities in the pool of mobility management entities,
estimate, based on the estimated load, a weight of the mobility management entity in the pool,
detect a load imbalance in the pool based on the estimated weight and weights associated with the other mobility management entities,
determine a number of subscribers to offload from the mobility management entity based on the estimated load,
determine to which of the other mobility management entities to offload the determined number of subscribers based on the estimated weight and the weights associated with the other mobility management entities, and
offload, to address the load imbalance, the determined number of subscribers to the determined other mobility management entities,
where, when offloading the determined number of subscribers to the determined other mobility management entities, each mobility management entity is further to:
offload the determined number of subscribers to the determined other mobility management entities when a token is received.

23. The system of claim 19, where each mobility management entity is further to:
advertise the estimated weight to one or more eNodeBs associated with each mobility management entity.

* * * * *

UNITED STATES PATENT AND TRADEMARK OFFICE
CERTIFICATE OF CORRECTION

PATENT NO. : 8,331,224 B2  
APPLICATION NO. : 12/623832  
DATED : December 11, 2012  
INVENTOR(S) : Meirosu et al.

Page 1 of 1

It is certified that error appears in the above-identified patent and that said Letters Patent is hereby corrected as shown below:

In Column 7, Line 67, delete "based load" and insert -- based on load --, therefor.

In Column 14, Line 56, delete "130-3 define" and insert -- 130-3 may define --, therefor.

In Column 23, Line 59, in Claim 1, delete "u date" and insert -- update --, therefor.

Signed and Sealed this  
Nineteenth Day of March, 2013

Teresa Stanek Rea  
*Acting Director of the United States Patent and Trademark Office*